United States Patent
Perry et al.

(10) Patent No.: US 12,493,965 B2
(45) Date of Patent: Dec. 9, 2025

(54) METHODS AND SYSTEMS FOR IMAGE PROCESSING

(71) Applicant: Enumera Molecular, Inc., Ann Arbor, MI (US)

(72) Inventors: Jeffrey Perry, Ann Arbor, MI (US); Vladislav Volman, San Diego, CA (US)

(73) Assignee: Enumera Molecular, Inc., Ann Arbor, MI (US)

( * ) Notice: Subject to any disclaimer, the term of this patent is extended or adjusted under 35 U.S.C. 154(b) by 357 days.

(21) Appl. No.: 18/256,704

(22) PCT Filed: Dec. 7, 2021

(86) PCT No.: PCT/US2021/062225
§ 371 (c)(1),
(2) Date: Jun. 9, 2023

(87) PCT Pub. No.: WO2022/125558
PCT Pub. Date: Jun. 16, 2022

(65) Prior Publication Data
US 2024/0046482 A1    Feb. 8, 2024

Related U.S. Application Data

(60) Provisional application No. 63/124,525, filed on Dec. 11, 2020.

(51) Int. Cl.
*G06T 7/194* (2017.01)
*G06T 7/11* (2017.01)
(Continued)

(52) U.S. Cl.
CPC ........... *G06T 7/194* (2017.01); *G06T 7/11* (2017.01); *G06V 10/751* (2022.01); *G06V 20/70* (2022.01); *G06T 2207/10056* (2013.01)

(58) Field of Classification Search
None
See application file for complete search history.

(56) References Cited

U.S. PATENT DOCUMENTS

| | | |
|---|---|---|
| 2006/0233421 A1 | 10/2006 | Portigal et al. |
| 2014/0134713 A1 | 5/2014 | Levenson et al. |
| 2022/0228968 A1 * | 7/2022 | Tenera Morgado .. G01J 3/2823 |

FOREIGN PATENT DOCUMENTS

| | | | | |
|---|---|---|---|---|
| WO | WO-2015044419 A1 * | 4/2015 | ............... | G06T 7/11 |
| WO | WO 2015/083002 | 6/2015 | | |

(Continued)

OTHER PUBLICATIONS

Sun, C.—"Improving Accuracy of Impervious Surface Extraction Based on a Threshold Hierarchical Method (THM)"—Applied Sciences Nov. 2020—pp. 1-14 (Year: 2020).*

(Continued)

*Primary Examiner* — Bernard Krasnic
(74) *Attorney, Agent, or Firm* — Casimir Jones, S.C.; Mary Ann D. Brow

(57) ABSTRACT

Methods, systems, computer programs and computer readable media comprising instructions for processing images and for analyzing samples are described, wherein the processing comprises performing spectral unmixing to identify regions of an image associated with one or more signals such as, e.g., fluorescent signals, luminescent signals, and/or colorimetric signals. The invention finds applications in the context of analysis of labelled samples, such as, e.g., for the purpose of detecting and/or quantifying molecules, molecular complexes, cells, subcellular structures, microorganisms, etc.

25 Claims, 16 Drawing Sheets

(51) Int. Cl.
*G06V 10/75* (2022.01)
*G06V 20/70* (2022.01)

(56) References Cited

FOREIGN PATENT DOCUMENTS

| WO | WO 2016/087589 | 6/2016 |
|---|---|---|
| WO | WO 2017/020023 | 2/2017 |
| WO | WO 2017/020024 | 2/2017 |
| WO | WO 2019/195346 | 10/2019 |

OTHER PUBLICATIONS

International Search Report and Written Opinion for PCT/US21/62225. Mailed Mar. 8, 2022. 8 pages.
Ali et al., Rolling circle amplification: a versatile tool for chemical biology, materials science and medicine. Chem Soc Rev. May 21, 2014;43(10):3324-41.
Dunn et al., A practical guide to evaluating colocalization in biological microscopy. Am J Physiol Cell Physiol. Apr. 2011;300(4):C723-42.
Mcrae et al., Robust blind spectral unmixing for fluorescence microscopy using unsupervised learning. PLoS One. Dec. 2, 2019;14(12):e0225410. 24 pages.
Meyer et al., Advances in DNA-directed immobilization. Curr Opin Chem Biol. Feb. 2014:18:8-15.
Preim et al., "Image Analysis for Medical Visualization", in Visual Computing for Medicine, Second Edition, 2014, 65 pages.
Selvin. Fluorescence resonance energy transfer. Methods Enzymol. 1995:246:300-34.
Stryer. Fluorescence energy transfer as a spectroscopic ruler. Annu Rev Biochem. 1978:47:819-46.
Valm et al., Multiplexed Spectral Imaging of 120 Different Fluorescent Labels. PLoS One. Jul. 8, 2016;11(7):e0158495. 17 pages.

* cited by examiner

METHODS AND SYSTEMS FOR IMAGE PROCESSING

The present application is a U.S. National Phase Application pursuant to 35 U.S.C. § 371 of International Application No. PCT/US2021/062225 filed Dec. 7, 2021, which claims priority to U.S. Provisional Application Ser. No. 63/124,525, filed Dec. 11, 2020. The entire disclosure contents of these applications are herewith incorporated by reference into the present application.

FIELD OF THE INVENTION

The present invention relates to methods for analyzing images, and in particular for dealing with spectral crosstalk in images. The technologies find use, for example, in any sample analysis where it is desirable to resolve distinct structures in the presence of crosstalk between sources of signal associated with these structures. Such situations commonly occur in fluorescence microscopy. Thus, the technologies find particular application in the context of analysis of fluorescently labelled biological samples, and in particular samples that have been labelled with a plurality of fluorescent dyes. This may be the case for example in molecular counting (e.g., in the context of genetic analyses), bacterial counting, and the like, where the technologies may be particularly advantageous.

BACKGROUND OF THE INVENTION

Fluorescence imaging is a powerful technique to analyze biological samples, allowing detection and spatial localization of structures labelled with fluorescence dyes, ranging from molecules (e.g., in the context of molecular counting) to cells and subcellular structures. In many applications, it is desirable to simultaneously image a plurality of fluorescent dyes. For example, in the context of molecular counting, different types of molecules of interest may be tagged with dedicated fluorophores, different samples may be tagged with different fluorophores and imaged together, etc. In the context of cell counting, different types of cells may be labelled with different fluorophores or combinations of fluorophores (e.g., for the purpose of counting different types of bacteria, different types of cells in a tissue sample, etc.). As another example, multiple cell types or intracellular structures may be labelled differently in order to investigate biological mechanisms of interest, to make a pathology assessment, etc. Thus, it is common for differently tagged structures to be multiplexed, and desirable for such differently tagged structures to be distinguishable in microscope images.

While many different types of labels detectable by imaging are now available, in practice the number of different labels that are distinguishable in a fluorescence microscopy image is severely limited by the phenomenon of "spectral crosstalk" (also sometimes refer to as "bleed through"). Spectral crosstalk refers to the interference that occurs in detection of signals associated with different labels due to overlapping emission in the range(s) of frequencies that are imaged. For example, this occurs when two fluorophores are emitting in the range of frequencies that is selected by a band-pass filter associated with a fluorescence channel, such that the intensity of the signal in this channel may be indicative of the presence of one or both of the fluorophores. Spectral crosstalk is particularly problematic when the signals at least partially co-localize and/or accurate quantification of the signals is desirable.

A range of approaches to deal with the problem of spectral crosstalk have been previously proposed, which are collectively referred to as "spectral unmixing" methods. A commonly used approach is "linear unmixing", where the signal in each fluorescence channel at each pixel in an image is modeled as a linear combination of reference spectra for all fluorophores. For each pixel, linear unmixing extracts the weight of each individual spectrum (also referred to as "estimated abundance"), with the weight assumed to be representative of the fluorophore's concentration. This method has been applied in a wide range of imaging modalities beyond fluorescence microscopy. However, this approach assumes linearity in the combination of the signals, as well as full independence between pixels. Because of these assumptions, it cannot deal with the presence of non-linear effects (such as quenching, photobleaching and two-photon absorption), the confidence in assignment of the correct label to structures with linear unmixing depends strongly on the signal to noise ratio in the data. These limitations in turn impact the accuracy of the method. More complex methods have been proposed to deal with some of these limitations.

For example, Valm et al. (PLOS One, 2016) describes a spectral image analysis algorithm utilizing a priori knowledge about labeled specimens and a binary label constraint on the unmixing solution, and demonstrates its use in identifying microbes labeled by fluorescence in situ hybridization. The approach comprises three steps: (i) concatenation of multiple excitation images (effectively use the information available from both excitation and emission spectra in assigning fluorophore abundances at each pixel), (ii) averaging of pixel intensities over all pixels in a segmented object in the raw spectral image before unmixing (effectively solving the linear unmixing once for each object), and (iii) linear unmixing with a binary label constraint on the least squares solution (assuming that each object is labeled with exactly two fluorophores). Steps (ii) and (iii) identify objects at the level of raw spectral images, then assign a single combination of fluorophores to each such object. As another example, McRae et al. (PLOS One, 2019) describes a spectral unmixing method that uses unsupervised machine learning clustering to learn individual fluorophores' spectral signatures from mixed images and blindly separate channels, and demonstrates its use in unmixing images of cells stained with different nuclei, actin and mitochondria dyes. The approach comprises: (i) applying a median filter to the raw image, (ii) applying k-means clustering with k=number of fluorophores+1 (for the background) to cluster the pixels, and (iii) create a new output image with k channels (one for each cluster) and pixel intensities selected as the highest intensity for the pixel across channels in the raw data. Steps (ii) and (iii) effectively assume that each pixel only shows signal for a single fluorophore, and attributes all of the signal in the most intense channel to that fluorophore. Both approaches make strong assumption, including at least the absence of overlap between structures associated with different fluorophores, potentially discarding valuable information.

The present invention attempts to alleviate some of the problems associated with prior art methods for spectral unmixing.

SUMMARY OF THE INVENTION

The present invention provides methods, systems, computer program products and computer readable media storing instructions for dealing with spectral crosstalk in the analysis of images.

The technology finds application, for example, in the analysis of fluorescence images, e.g., to analyze fluorescently labelled samples, in many contexts including molecular counting, cell biology, bacterial counting, pathology, etc.

According to a first aspect there is provided a method of processing images, the method comprising the steps of: receiving image data comprising a plurality of single channel images of an area of a sample; performing image segmentation of each single channel image individually, to identify sets of pixels that form objects; performing pixel unmixing at least for pixels that form part of at least two of said identified objects, to determine the estimated abundance of the signal in the respective channels, in each of said unmixed pixels. The method further comprises, for each of said identified objects: identifying a candidate channel as one of the plurality of channels, based on the estimated abundances for the pixels in the respective object; and removing the object from the results of the image segmentation step if one or more conditions(s) are satisfied, the one or more condition(s) comprising: the candidate channel being different from the channel in which the object was identified, thereby obtaining updated image segmentation results.

The present inventors have identified that by performing unmixing on a pixel basis then on a channel-specific object basis, it was possible to remove objects that result from spectral crosstalk without removing objects that are associated with a true signal in a channel even in the presence of partial overlap between the physical sources of the signals associated with the objects at the image resolution available.

The method may have any one or more of the following features.

The one or more conditions may further comprise: the source of a signal associated with the candidate channel being a source that is known to produce a signal in the channel in which the object was identified. By further requiring that this criterion is verified, the method ensures that an object is only removed due to assumed crosstalk if the known or assumed characteristics of the sample that is imaged supports the presence of crosstalk. As a result, the number of true objects that are removed is reduced while still efficiently removing those objects that show evidence of spectral crosstalk.

Pixel unmixing may only be performed for pixels that form part of at least two of said identified objects. Performing pixel unmixing for pixels that form part of at least two of said identified objects results in estimated abundances for all pixels that are shared between channels. The pixel umixing step may be performed only for such shared pixels in order to reduce the computational burden of pixel unmixing, with no impact on the performance of the object unmixing process described herein. Alternatively, pixel unmixing may be performed for all pixels that form part of at least one identified object. This may also reduce the computational burden of pixel unmixing, with no impact on the performance of the object unmixing process. Therefore, the method may comprise performing pixel unmixing only for pixels that form part of at least one of said identified objects. This does not require cross-referencing of the pixels identified in the respective images.

Identifying a candidate channel as one of the plurality of channels may comprise assigning a single channel to each pixel in the object. For each unmixed pixel, the single channel may be assigned based on the estimated abundances for the pixel. Identifying a candidate channel as one of the plurality of channels may further comprise assigning the single channel that is associated with the highest number of pixels in the object as the candidate channel for the object. Assigning a single channel to each unmixed pixel in the object may comprise assigning the single channel that is associated with the highest estimated abundance for the respective unmixed pixel.

Identifying a candidate channel for an object may comprise determining a set of summarized estimated abundances for the object, based on the estimated abundances for the pixels in the object. Determining a set of summarized abundances for each object may comprise associating estimated abundances for all pixels in objects that have not been unmixed/pixels that belong to a single object. For example, estimated abundances for a pixel that has not been unmixed can be obtained by: setting a predetermined high value for the estimated abundance for the channel in which the object to which the pixel belongs was identified, and setting a predetermined low value for the estimated abundances for all other channels.

Identifying a candidate channel as one of the plurality of channels may comprise assigning the single channel that is associated with the highest summarized estimated abundance as the candidate channel for the object.

A set of summarized estimated abundances for an object may be obtained as a measure of centrality of the estimated abundances for the pixels in the object, such as the channel-wise average of the estimated abundances of the pixels in the object.

The one or more conditions may comprise: the relative likelihood of the object belonging to the candidate channel and the channel in which the object was identified being above a predetermine threshold, optionally wherein the relative likelihood is an odds ratio. The likelihood of the object belonging to a subject channel may be determined using a summarized estimated abundance for the object, in the subject channel ($\widehat{p_n^c}$), determined based on the estimated abundances for the subject channel associated with the pixels in the object. The likelihood of the object belonging to a subject channel may be determined as $$\frac{(1 - \widehat{p_n^c})}{\widehat{p_n^c}}$$

where $\widehat{p_n^c}$ is the summarized estimated abundance for the object, in the subject channel.

Performing image segmentation may comprise identifying foreground pixels in each of the single channel images, wherein objects only include foreground pixels. Identifying foreground pixels may comprise identifying background pixels as any pixel in an image that is not a foreground pixel. The method may further comprise setting background pixels to a predetermined value, wherein the predetermined value is lower than the intensity of all foreground pixels.

Identifying foreground pixels in a subject single channel image may comprise: using one or more corresponding negative control image(s), defining a threshold on the difference between pixel intensities and corresponding neighbourhood pixel intensities; and applying the threshold to the pixels in the subject image, wherein a pixel is identified as foreground if the difference between the intensity of said pixel and corresponding neighbourhood pixel intensities is at or above the threshold. Defining a threshold on the difference between pixel intensities and corresponding neighbourhood pixel intensities may comprise obtaining the distribution of differences between pixel intensities and corresponding neighbourhood pixel intensities in the one or more negative control images, and identifying the threshold as a percentile value in said distribution.

The results of the image segmentation step may comprise a segmentation map where pixels in objects are labelled differently from pixels not in objects. Removing an object from the results of the image segmentation step may comprise re-labelling the pixels that form the object, in the segmentation map, to match the labels of pixels not in objects.

The image segmentation step may be wholly or partially re-run after all objects in an image have been processed. This may be advantageous for consistency in downwards processing steps.

The method may further comprise: outputting to a user, using a user interface, the updated image segmentation results for at least one of the single channel images. The outputting may comprise displaying the updated image segmentation results overlaid on one or more corresponding single channel image(s). A user interface may include a display, or any other means of communicating visual information to a user.

As the skilled person understands, the methods according to the present aspect are of such complexity that they cannot be performed mentally. As such, the methods described herein are typically computer implemented.

The single channel images may be microscope images. The single channel images may be fluorescence microscope images. The sample may be a sample that includes a plurality of fluorescent labels, each fluorescent label being associated with one of the plurality of channels.

The method may further comprise using the updated image segmentation results to identify the presence and/or abundance of signals associated with the objects in the single channels.

The sample may be a nucleic acid sample, a DVA sample, a genomic DNA sample or a cell-free DNA sample. The method may be used to identify the presence and/or abundance of one or more labelled nucleic acids, wherein labelled nucleic acids correspond to object in the updated image segmentation results. Thus, the methods described herein may be used to detect the presence and/or abundance of particular nucleic acids. This may be used, for example, to detect aneuploidies, such as fetal aneuploidies, for example by analyzing a maternal sample comprising fetal DNA (e.g., a cell-free DNA sample).

According to a second aspect, there is provided a system for processing microscope images, the system comprising: at least one processor; and at least one non-transitory computer readable medium containing instructions that, when executed by the at least one processor, cause the at least one processor to perform the method of any embodiment of the first aspect.

The system may further comprise a user interface. The system may further comprise image acquisition means. The image acquisition means may include a microscope. The microscope may be a fluorescence microscope. The elements of the system are communicably coupled in order to be able to exchange information such as instructions, data (e.g., imaging data, segmentation results, etc.).

According to a third aspect, there is provided one or more non-transitory computer readable medium (or media) comprising instructions that, when executed by at least one processor, cause the at least one processor to perform the method of embodiment of the first aspect.

According to a fourth aspect, there is provided a computer program comprising code which, when the code is executed on a computer, causes the computer to perform the method of any embodiment of the first aspect.

According to a fifth aspect, there is provided a method of analyzing a sample, the method comprising: obtaining image data of an area of the sample, the image data comprising a plurality of single channel images; performing image segmentation of each single channel image individually, to identify sets of pixels that form objects; performing pixel unmixing at least for pixels that form part of at least two of said identified objects, to determine the estimated abundance of the signal in the respective channels, in each of said unmixed pixels; for each of said identified objects: identifying a candidate channel as one of the plurality of channels, based on the estimated abundances for the pixels in the respective object; and removing the object from the results of the image segmentation step if one or more conditions(s) are satisfied, the one or more condition(s) comprising: the candidate channel being different from the channel in which the object was identified, thereby obtaining updated image segmentation results. Obtaining image data of an area of the sample may comprise receiving image data comprising a plurality of single channel images of an area of the sample. Obtaining image data of an area of the sample may comprise acquiring image data comprising a plurality of single channel images of an area of the sample.

The method may comprise obtaining the sample and/or labelling the sample with one or more sources of electromagnetic signal. The one or more sources of electromagnetic signals may be selected from fluorescent labels, luminescent labels, and colorimetric labels. For example, the one or more sources of electromagnetic signals may be fluorescent dyes.

The method may have any of the features described in relation to the first aspect.

According to a sixth aspect, there is provided a method of identifying objects in images of a sample, wherein each object is associated with a particular source or combination of sources of electromagnetic signal, the method comprising the steps of: receiving image data comprising a plurality of single channel images of an area of the sample; performing image segmentation of each single channel image individually, to identify sets of pixels that form objects; performing pixel unmixing at least for pixels that form part of at least two of said identified objects, to determine the estimated abundance of the signal in the respective channels, in each of said unmixed pixels; for each of said identified objects: identifying a candidate channel as one of the plurality of channels, based on the estimated abundances for the pixels in the respective object; and removing the object from the results of the image segmentation step if one or more conditions(s) are satisfied, the one or more condition(s) comprising: the candidate channel being different from the channel in which the object was identified, thereby obtaining updated image segmentation results.

The sample may be a labelled sample, and the sources of electromagnetic signal may be single labels (e.g., a fluorescent dye) or combinations of labels (e.g., fluorescent dyes).

The method may have any of the features described in relation to the first aspect.

According to a further aspect, there is provided a method for counting labelled structures in a sample, the method comprising: receiving image data comprising a plurality of single channel images of an area of the sample, wherein the labelled structures are associated with an electromagnetic signal in at least one of the channels; performing image segmentation of each single channel image individually, to identify sets of pixels that form objects; performing pixel unmixing at least for pixels that form part of at least two of said identified objects, to determine the estimated abundance of the signal in the respective channels, in each of said unmixed pixels; for each of said identified objects: identifying a candidate channel as one of the plurality of channels, based on the estimated abundances for the pixels in the respective object; removing the object from the results of the image segmentation step if one or more conditions(s) are satisfied, the one or more condition(s) comprising: the candidate channel being different from the channel in which the object was identified, thereby obtaining updated image segmentation results; and counting the number of objects in the at least one channel in which the labelled structures are associated with an electromagnetic signal, in the updated image segmentation results, wherein the number of objects in the at least one channel represents the number of labelled structures in the area of the sample. The objects may be counted separately in each of the channels.

The labelled structures may be associated with one or more sources of electromagnetic signal, which may be a single label (e.g., a fluorescent dye) or a combination of labels (e.g., fluorescent dyes).

The method may have any of the features described in relation to the preceding aspects.

DEFINITIONS

To facilitate an understanding of the present invention, a number of terms and phrases are defined below:

As used herein, spectral crosstalk (also referred to herein simply as "crosstalk") refers to the interference that occurs in detection of signals associated with different sources of electromagnetic signal (e.g., labels such as fluorescent labels) due to overlapping emission in the range(s) of frequencies (channels) that are imaged. For example, spectral crosstalk occurs when signal that is assumed to be associated with a first wavelength or range of wavelengths is detected in a channel that records signal for a second (different) wavelength or range of wavelengths. The signal that is assumed to be associated with a first wavelength or range of wavelength may be associated with (i.e. produced by) a first source of electromagnetic signal. A second source of electromagnetic signal may be assumed to be associated with the second wavelength or range of wavelengths. Thus, the channel that records signal for the second wavelength or range of wavelengths may be assumed to be associated with the second source of electromagnetic signal, whereas the signal recorded may also be impacted by the presence of the first source of electromagnetic signal. A channel may be assumed to be associated with a single source of electromagnetic signal when the wavelength(s) recorded in the channel are chosen such that said source of electromagnetic signal has the highest relative emission in said wavelength(s), amongst a plurality of sources of electromagnetic signal. The concept is not limited in principle to any numbers of sources of electromagnetic signals and channels. Further, when a plurality of channels are used, one or more of the channels may be subject to cross-talk, and one or more (other) channels may not be subject to cross-talk. For example, a first set of sources of electromagnetic signal (the first set of sources comprising one or more sources) may each be associated with a respective channel in a first set of channels (the first set of channels comprising one or more channels), wherein the channels in the first set are not subject to cross-talk, and a second set of sources of electromagnetic signal (the second set of sources comprising one or more sources) may be associated with a respective channel in a second set of channels (the second set of channels comprising one or more channels), wherein each channel in the second set is subject to cross-talk from one or more channels in the first or second set of channels.

As used herein, the term "channel" (or "imaging channel") refers to a range of wavelengths (or corresponding frequencies) at which an electromagnetic signal is recorded such that the signal across all of the recorded wavelengths is output as a combined signal (e.g., a single channel image, where the intensity of every pixel reflects the combined intensity of the signal in the recorded wavelength(s)). In practice, a range of wavelengths may be a single wavelength or may comprise or encompass multiple wavelengths. Multiple wavelengths may be included in a range which may be continuous or discontinuous. The signal from a channel may be provided as a single color image (also referred to herein as a "single channel image"), or may form part of a multicolor image. A single colour image may be a grayscale image where the pixel intensities are representative of the signal intensity across the range of wavelengths. A multicolour image may comprise intensities for each pixel along each of multiple channels (sometimes referred to as "primary colours"). The intensity along each of these channels individually may be stored as a grayscale image capturing pixel intensities with respect to a single one of the primary colors that make up a multicolor image.

As used herein, the term "spectral unmixing" (also referred to herein simply as "unmixing" or "spectral demultiplexing") refers to the process of resolving interference between multiple sources of electromagnetic signal with overlapping spectra. In particular, physically distinct sources of electromagnetic signal may be associated with signal in multiple channels, leading to misidentification of the location and/or abundance of the sources of electromagnetic signal. For example, the multiple sources of electromagnetic signal may be fluorescent labels such as dyes, fluorescent proteins, etc., luminescent labels (e.g., bioluminescent labels) such as e.g., enzymes that catalyze reactions that generate light (e.g., luciferase), colorimetric labels (such as e.g., enzymes that catalyze reaction that produce a colored product, such as e.g., horseradish peroxidase, calf intestine alkaline phosphatase, beta-galactosidase, etc.) or any other source of electromagnetic signal known to the skilled person. A plurality of labels (e.g., fluorescent labels, luminescent labels, colorimetric labels, etc.) may be used e.g., for the purpose of multiplexing samples, or simultaneous detection of differently labelled structures. When a plurality of labels (e.g., a plurality of fluorescent dyes) are used, some of the labels may have at least partially overlapping emission spectra.

Further, specific ranges of wavelengths may be captured in each of a plurality of imaging channels. Each such imaging channel may be assumed to be associated with one of the plurality of labels. This assumption is reasonable when only one label emits in the wavelength range(s) that are captured in the channel. In such a case, the intensity of the signal is representative of the abundance of the label at the imaged location. However, when the range(s) of wavelengths captured in a channel include ranges where more than one of the labels has non-zero emission, and the resolution of the image is such that more than one type of label may emit signal located within the same pixel, the signal in said channel may in fact represent a combination of the abundances of the labels that emit in this channel. This is referred to as cross-talk. Spectral unmixing refers to the process of attributing observed signal to one or more of a plurality of different sources of electromagnetic signal (e.g., fluorescent dyes) in the presence of such cross-talk. In preferred embodiments, spectral unmixing is performed using a method that produces estimates of the relative abundances of a plurality of different sources of electromagnetic signal in one or more pixels. The term "pixel unmixing" refers to the process of spectral unmixing when applied on a pixel-basis. Preferably, pixel unmixing is performed using a method that comprises estimating the relative abundance of a plurality of different sources of electromagnetic signal in each unmixed pixel.

The terms "blind spectral unmixing" refer to the separation of channels without prior knowledge of the number of different sources of electromagnetic signal (e.g., fluorophores) or their excitation/emission spectra. By contrast, "non-blind unmixing" refers to spectral unmixing approaches that make use of prior knowledge on the different sources of electromagnetic signal (e.g., fluorophores) to be unmixed, as well as their respective spectra. This knowledge is typically in the form of a spectral unmixing matrix (also referred to as "spectral overlap matrix"), which records the relative emission of the different sources of electromagnetic signal in each of a plurality of channels represented in image data.

A spectral unmixing matrix is typically a matrix of size n×n where n is the number of different sources of electromagnetic signal (e.g., fluorescent labels, luminescent labels, colorimetric labels) and corresponding channels, with elements $a_{ij}$ capturing the relative emission of source j (e.g., dye/label j) in channel i (e.g., at the particular wavelength(s) recorded in channel i). Each source of electromagnetic signal may be associated with a channel, in the sense that the wavelength(s) recorded in the channel is/are chosen to include the wavelength(s) at which the particular source of electromagnetic signal has the highest relative emission amongst the plurality of sources of electromagnetic signal that are being detected. For example, each of the channels may record signal at a wavelength that corresponds to the peak emission wavelength of one of a plurality of sources of electromagnetic signal. In the particular example of the plurality of sources of electromagnetic signal comprising fluorescent labels (e.g., dyes, fluorescent molecules, etc.), each fluorescent label may be associated with a respective peak emission at a respective peak emission wavelength, and each channel may record signal at the respective peak emission wavelength or in a (preferably narrow) range including the respective peak emission wavelength. A spectral unmixing matrix captures the relative emission of the various sources of electromagnetic signal in each of the respective imaging channels used in a particular imaging process. These may be influenced by a plurality of factors related to the source of electromagnetic signal themselves (e.g., the excitation and emission spectra in the case of fluorescent labels), as well as the imaging system used (e.g., the choice of channels, the type of excitation source(s), the spectrum/spectra of the excitation source(s), the dichroic mirrors used, the emission filters used, the exposure time, the efficiency of the detector(s) at different wavelengths, etc.). In other words, a spectral unmixing matrix comprises coefficients that may capture one or more factors that has/have an impact on the mixing process. In a simple case, using the known (assumed, experimentally determined or otherwise known) excitation and emission spectra of the plurality of fluorescent labels, a spectral unmixing matrix can be obtained by determining the relative emission of each of the plurality of fluorescent labels at the peak emission wavelength of each of the plurality of fluorescent labels associated with an emission channel. Thus, the excitation and/or emission spectra may be theoretical/reference spectra for a particular source of electromagnetic signal (e.g., a fluorescent label), or effective spectra that also capture features of a particular imaging system being used to detect the signals associated with said sources.

As used herein, an emission spectrum for a particular source of electromagnetic signal quantifies the emission power for a plurality of wavelengths at which the source of electromagnetic signal emits electromagnetic radiation. A relative emission spectrum is an emission spectrum that has been normalized such that the range if emission power in the spectrum is between 0 and 1 (or between 0 and 100%), by dividing the emission power at each wavelength in the spectrum by the emission power at the peak emission wavelength (in other words, by dividing the emission power at each wavelength in the spectrum by the maximum emission power in the spectrum).

Non-blind unmixing can be linear or non-linear. Linear unmixing solves an equation of the form: C=AP+E, for each pixel, where C is a vector $[c_1, \ldots c_n, 1]$ of measured normalized intensities (i.e. summing to 1 by normalization:

$$c_i / \sum_{i=1}^{n} c_i)$$

at the pixel for each of the n channels, A is a matrix comprising the spectral unmixing matrix and an additional row of coefficients set to 1, P is a vector of estimated abundances $p_i$ for each of the n channels (constrained to $\Sigma_{i=1}^{n} p_i = 1$ and $p_i \geq 0$), and E is a vector of noise terms $e_i$ for each of the n channels. As a separate linear equation is solved for each pixel, linear pixel unmixing assumes that pixels are independent and that there are no light saturation effects. Linear unmixing represents a trade-off between these limitations and computational efficiency. By contrast, nonlinear unmixing does not make these assumptions. Many different non-linear unmixing approaches exist. Many unmixing approaches aim to identify the likely true relative intensities (also referred to as abundance) attributable to each of the sources of electromagnetic signal, in an unmixed pixel or collection of pixels. When a single source of electromagnetic signal can be expected to be present in each pixel, the estimated abundances can be interpreted as the likelihood of the pixel containing each of the plurality of sources of electromagnetic signal.

As used herein, "thresholding" refers to the use of a threshold to assign pixels in an image as foreground or background. In its simplest form, thresholding identifies a pixel as foreground if the pixel intensity is at or above a predetermined threshold, and background otherwise. Any thresholding method known in the art may be used. The thresholding may be local or global. Local thresholding may also be referred to as "adaptive thresholding". Local thresholding may comprise determining whether a pixel is a foreground of a background pixel based at least in part on the characteristics of the image in a set of pixels around the subject pixel (also referred to as "neighborhood"). This is typically performed by applying a specific threshold for each neighborhood, where the threshold for a subject pixel is defined based at least in part on the pixel intensities in the neighborhood of the subject pixel. Instead or in addition to this, a threshold may be applied to a value that characterizes the pixel and its neighborhood (e.g., the difference between the subject pixel intensity and the pixel intensities of the pixels in the neighborhood). Global thresholding may comprise using a common threshold for all pixels in the image.

As used herein, "image segmentation" (also referred to herein simply as "segmentation") refers to the process of identifying objects in an image. In practice, segmentation identifies sets of pixels that together form "objects". Many segmentation methods are known in the art. Within the context of the present disclosure, image segmentation may be performed using any method known in the art, provided that the method identifies sets of pixels that form objects. For example, segmentation may be performed using the Watershed algorithm. For example, the "Watershed by flooding" approach may be used. Any other Watershed method may be used, for example as reviewed in Preim & Botha (2014), which is incorporated herein by reference.

As used herein, the terms "negative control image" refers to an image that is acquired in the absence of any intentional source of signal, at least in a channel for which the negative control image is used as a negative control. The channel for which the negative control image is used may be referred to as a "subject channel", associated with one or more "subject images", and the negative control image acquired in the same channel in the absence of any intentional source of signal in the subject channel may be referred to as a "corresponding negative control image". For example, a corresponding negative control image may be an image of a negative control sample that is acquired for the same channel as a subject image. A negative control sample may be a sample that does not include the source(s) of electromagnetic signal that is detected in the images, such as e.g., one or more fluorescent dyes. In some cases, a negative control sample may be a sample that has not been labelled with one or more fluorescent dyes. As used herein, the terms "pixel neighborhood" (also referred to herein simply as "neighborhood") refer to a set of pixels that are located in a predetermined area around a subject pixel. For example, a neighborhood may be defined as a set of pixels located within a square area centered around a subject pixel. A square area may be defined as an area of n×n pixels, where n is an integer which may be selected from 1, 2, 3, 4, 5, 6, 7, 8, 9, 10, 11, 15, 20, between 1 and 30, between 1 and 20, between 5 and 15, etc. The inventors have found a pixel neighborhood of 11×11 pixels to be suitable. As the skilled person understands, an appropriate size and shape of neighborhood may depend on the characteristics of the images that are being processed, such as e.g., the resolution of the images, the expected density of the signal, etc. The present invention is not limited in this regard.

As used herein, the terms "pixel neighborhood intensity offset" refer to the difference between the intensity of a pixel and corresponding neighborhood pixel intensities. The concept of pixel neighbourhood intensity offset may be used in the context of thresholding. The pixel neighborhood intensity offset of a subject pixel may comprise a set of values, each corresponding to the difference between the intensity of the subject pixel and the intensity of a pixel in the neighborhood of the subject pixel. A pixel neighborhood intensity offset of a subject pixel may comprise a single value, which may be derived from a set of values as, e.g., a measure of centrality of the set of values, or may be obtained as the difference between the intensity of the subject pixel and a summarized measure of intensity (e.g., a measure of centrality such as the average, median, mode, etc.) for the pixels in the neighborhood of the subject pixel. Further, pixel neighborhood intensity offsets may be defined as sets of values for the purpose of defining a threshold on pixel neighbourhood intensity offsets, and as single values for the purpose of identifying foreground pixels. For example, a pixel neighbourhood intensity offset threshold may be defined using one or more negative control image(s) by determining the distribution of differences between each pixel and each of the pixels in the respective pixel neighborhood, and selecting a percentile value in said distribution. Then, the threshold may be applied to one or more subject image(s) by comparing, for each pixel, the difference between the pixel intensity and the median intensity (or any other summarized measure of intensity) of its neighborhood, to the previously defined threshold.

As used herein, the terms "computer system" includes the hardware, software and data storage devices for embodying a system or carrying out a method according to the above described embodiments. For example, a computer system may comprise a central processing unit (CPU), input means, output means and data storage, which may be embodied as one or more connected computing devices. Preferably the computer system has a display or comprises a computing device that has a display to provide a visual output display (for example in the design of the business process). The data storage may comprise RAM, disk drives or other computer readable media. The computer system may include a plurality of computing devices connected by a network and able to communicate with each other over that network.

As used herein, the term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

As used herein, the terms "subject" and "patient" refer to any organisms including plants, microorganisms and animals (e.g., mammals such as dogs, cats, livestock, and humans).

The term "sample" in the present specification and claims is used in its broadest sense. On the one hand it is meant to include a specimen or culture (e.g., microbiological cultures). On the other hand, it is meant to include both biological and environmental samples. A sample may include a specimen of synthetic origin. Biological samples may be animal, including human, fluid, solid (e.g., stool) or tissue, as well as liquid and solid food and feed products and ingredients such as dairy items, vegetables, meat and meat by-products, and waste. Biological samples may be obtained from all of the various families of domestic animals, as well as feral or wild animals, including, but not limited to, such animals as canines, felines, ungulates, bear, fish, lagomorphs, rodents, marsupials, etc.

Environmental samples include environmental material such as surface matter, soil, water and industrial samples, as well as samples obtained from food and dairy processing instruments, apparatus, equipment, utensils, disposable and non-disposable items. These examples are not to be construed as limiting the sample types applicable to the present invention.

The term "target" as used herein refers to a structure sought to be detected amongst other structures or components of a sample for assessment, measurement, or other characterization. For example, a target nucleic acid may be sorted from other nucleic acids in a sample, e.g., by probe binding, amplification, isolation, capture, etc. When used in reference to a hybridization-based detection, e.g., polymerase chain reaction, "target" refers to the region of nucleic acid bounded by the primers used for polymerase chain reaction, while when used in an assay in which target DNA is not amplified, e.g., in capture by molecular inversion probes (MIPS), a target comprises the site bounded by the hybridization of the target-specific arms of the MIP, such that the MIP can be ligated and the presence of the target nucleic acid can be detected.

The term "primer" refers to an oligonucleotide that is capable of acting as a point of initiation of synthesis when placed under conditions in which primer extension is initiated, e.g., in the presence of nucleotides and a suitable nucleic acid polymerase. An oligonucleotide "primer" may occur naturally, may be made using molecular biological methods, e.g., purification of a restriction digest, or may be produced synthetically. Primers made of or comprising DNA are commonly used.

The term "label" as used herein refers to any atom or molecule that can produce an electromagnetic signal, and hence can be used to provide a detectable (preferably quantifiable) effect. A label can be attached to or form part of a target structure. Labels include but are not limited to dyes; luminescent, chromogenic, phosphorescent or fluorogenic moieties; and fluorescent dyes alone or in combination with moieties that can suppress ("quench") or shift emission spectra by fluorescence resonance energy transfer (FRET). FRET is a distance-dependent interaction between the electronic excited states of two molecules (e.g., two dye molecules, or a dye molecule and a non-fluorescing quencher molecule) in which excitation is transferred from a donor molecule to an acceptor molecule without emission of a photon. (Stryer et al., 1978, Ann. Rev. Biochem., 47:819; Selvin, 1995, Methods Enzymol., 246:300, each incorporated herein by reference). As used herein, the term "donor" refers to a fluorophore that absorbs at a first wavelength and emits at a second, longer wavelength. The term "acceptor" refers to a moiety such as a fluorophore, chromophore, or quencher that has an absorption spectrum that overlaps the donor's emission spectrum, and that is able to absorb some or most of the emitted energy from the donor when it is near the donor group (typically between 1-100 nm). If the acceptor is a fluorophore, it generally then re-emits at a third, still longer wavelength; if it is a chromophore or quencher, it then releases the energy absorbed from the donor without emitting a photon. In some embodiments, changes in detectable emission from a donor dye (e.g. when an acceptor moiety is near or distant) are detected. In some embodiments, changes in detectable emission from an acceptor dye are detected. In preferred embodiments, the emission spectrum of the acceptor dye is distinct from the emission spectrum of the donor dye such that emissions from the dyes can be differentiated (e.g., spectrally resolved) from each other.

As used herein, the terms "solid support" or "support" refer to any material that provides a substrate structure to which another material can be attached. A support or substrate may be, but need not be, solid. Support materials include smooth solid supports (e.g., smooth metal, glass, quartz, plastic, silicon, wafers, carbon (e.g., diamond), and ceramic surfaces, etc.), as well as textured and porous materials. Solid supports need not be flat. Supports include any type of shape, including spherical shapes (e.g., beads). Support materials also include, but are not limited to, gels, hydrogels, aerogels, rubbers, polymers, and other porous and/or non-rigid materials.

As used herein, the terms "bead" and "particle" are used interchangeably, and refer to a small support, typically a solid support, that is capable of moving about when in a solution (e.g., it has dimensions smaller than those of the enclosure or container in which the solution resides). In some embodiments, beads may settle out of a solution when the solution is not mixed (e.g., by shaking, thermal mixing, vortexing), while in other embodiments, beads may be suspended in solution in a colloidal fashion. In some embodiments, beads are completely or partially spherical or cylindrical. However, beads are not limited to any particular three-dimensional shape. In some embodiments, beads or particles may be paramagnetic. For example, in some embodiments, beads and particles comprise a magnetic material, e.g., ferrous oxide. A bead or particle is not limited to any particular size, and in a preparation comprising a plurality of particles, the particles may be essentially uniform in size (e.g., in diameter) or may be a mixture of different sizes. In some embodiments, beads comprise or consist of nanoparticles, e.g., particles of less than about 1000 nm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 5 nm, or 1 nm in diameter. In some embodiments, the nanoparticle beads between 5 and 20 nm average diameter.

Materials attached to a solid support may be attached to any portion of the solid support (e.g., may be attached to an interior portion of a porous solid support material, or to an exterior portion, or to a flat portion on an otherwise non-flat support, or vice versa). In preferred embodiments of the technology, biological molecules such as nucleic acid or protein molecules are attached to solid supports. A biological material is "attached" to a solid support when it is affixed to the solid support through chemical or physical interaction. In some embodiments, attachment is through a covalent bond. However, attachments need not be covalent and need not be permanent. In some embodiments, an attachment may be undone or disassociated by a change in condition, e.g., by temperature, ionic change, addition or removal of a chelating agent, or other changes in the solution conditions to which the surface and bound molecule are exposed. Materials may be attached to a first support and localized to the surface of a second support. For example, in materials that comprise a ferrous or magnetic particle may be magnetically localized to a surface or a region of a surface, such as a planar surface of a slide or well.

As used herein in reference to a support or substrate, e.g., for a coating or for attachment of a molecule, the term "surface" broadly refers to a portion of a support or substrate that is accessible for a purpose. For example, a portion of a bead or vessel or plate that is accessible to be coated, functionalized, attached to a moiety, e.g., an oligonucleotide or other macromolecule, or otherwise treated, may be considered a "surface" of the bead or plate, even if the surface is on an interior portion of the bead or vessel (e.g., within a pore, within a sintered matrix, inside a well, etc.) Similarly, a portion of a matrix that is flexible and/or porous (e.g., a hydrogel, aerogel, mesh, and that is accessible for a purpose, e.g., to be coated, functionalized, attached to a moiety, derivatized, etc., may be considered a surface of the matrix. In certain embodiments, a support may comprise a support surface, sometimes termed a first surface, which is the surface of the structural support material, e.g., in the absence of a coating or modifying layer, and may further comprise substrate surface, sometimes termed a second surface, which is the surface that is accessible for a purpose after the support surface is modified, e.g., by coating with a polymer or other coating. In some embodiments, the substrate surface comprises functional groups capable of complexing covalently or non-covalently with the one or more analytes, such as oligonucleotides or polypeptides that comprise reactive or binding groups suitable for complexing with the substrate surface functional groups.

As used herein, the terms "dispersed" and "dispersal" as used in reference to structures, e.g., on a support or surface, refers to a collection of loci or sites that are distributed or scattered on or about the surface. At least some of the loci are preferably sufficiently separated from other structures that they are individually detectable or resolvable, one from another, e.g., by a detector such as a microscope.

As used herein, the term "irregular" or "dispersed" as used in reference to a dispersal or distribution of structures, e.g., on a solid support or surface, refers to distribution of structures on or in a surface in a non-arrayed manner. For example, molecules may be irregularly dispersed on a surface by application of a solution of a particular concentration that provides a desired approximate average distance between the molecules on the surface, but at sites that are not pre-defined by or addressable any pattern on the surface or by the means of applying the solution (e.g., inkjet printing). In such embodiments, analysis of the surface may comprise finding the locus of a molecule by detection of a signal wherever it may appear (e.g., scanning a whole surface to detect fluorescence anywhere on the surface). This contrasts to locating a signal by analysis of a surface or vessel only at predetermined loci (e.g., points in a grid array), to determine how much (or what type of) signal appears at each locus in the grid.

As used herein, the term "distinct" or "different" in reference to signals refers to signals that can be differentiated one from another, e.g., by spectral properties such as fluorescence emission wavelength, color, absorbance, mass, size, fluorescence polarization properties, charge, etc., or by capability of interaction with another moiety, such as with a chemical reagent, an enzyme, an antibody, etc.

As used herein, the term "probe" or "hybridization probe" refers to an oligonucleotide (i.e., a sequence of nucleotides), whether occurring naturally as in a purified restriction digest or produced synthetically, recombinantly or by PCR amplification, that is capable of hybridizing, at least in part, to another oligonucleotide of interest. A probe may be single-stranded or double-stranded. Probes are useful in the detection, identification and isolation of particular sequences. In some preferred embodiments, probes used in the present invention will be labeled with a "reporter molecule," so that is detectable in any detection system, including, but not limited to enzyme (e.g., ELISA, as well as enzyme-based histochemical assays), fluorescent, radioactive, and luminescent systems. It is not intended that the present invention be limited to any particular detection system or label.

The term "MIP" as used herein, refers to a molecular inversion probe (or a circular capture probe). Molecular inversion probes (or circular capture probes) are nucleic acid molecules that comprise a pair of unique polynucleotide arms that hybridize to a target nucleic acid to form a nick or gap and a polynucleotide linker (e.g., a universal backbone linker). In some embodiments, the unique polynucleotide arms hybridize to a target strand immediately adjacent to each other to form a ligatable nick (generally termed "padlock probes") while in some embodiments, one the hybridized MIP may be further modified (e.g., by polymerase extension, base excision, and/or flap cleavage) to form a ligatable nick. Ligation of a MIP probe to form a circular nucleic acid is typically indicative of the presence of the complementary target strand. In some embodiments, MIPs comprise one or more unique molecular tags (or unique molecular identifiers).

As used herein, the terms "circular nucleic acid" and "circularized nucleic acid" as used, for example, in reference to probe nucleic acids, refers to nucleic acid strands that are joined at the ends, e.g., by ligation, to form a continuous circular strand of nucleic acid.

The unique molecular tag may be any tag that is detectable and can be incorporated into or attached to a nucleic acid (e.g., a polynucleotide) and allows detection and/or identification of nucleic acids that comprise the tag. In some embodiments the tag is incorporated into or attached to a nucleic acid during sequencing (e.g., by a polymerase). Non-limiting examples of tags include nucleic acid tags, nucleic acid indexes or barcodes, radiolabels (e.g., isotopes), metallic labels, fluorescent labels, chemiluminescent labels, phosphorescent labels, fluorophore quenchers, dyes, proteins (e.g., enzymes, antibodies or parts thereof, linkers, members of a binding pair), the like or combinations thereof. In some embodiments, particularly sequencing embodiments, the tag (e.g., a molecular tag) is a unique, known and/or identifiable sequence of nucleotides or nucleotide analogues (e.g., nucleotides comprising a nucleic acid analogue, a sugar and one to three phosphate groups). In some embodiments, tags are six or more contiguous nucleotides. A multitude of fluorophore-based tags are available with a variety of different excitation and emission spectra. Any suitable type and/or number of fluorophores can be used as a tag. In some embodiments 1 or more, 2 or more, 3 or more, 4 or more, 5 or more, 6 or more, 7 or more, 8 or more, 9 or more, 10 or more, 20 or more, 30 or more, 50 or more, 100 or more, 500 or more, 1000 or more, 10,000 or more, 100,000 or more different tags are utilized in a method described herein (e.g., a nucleic acid detection and/or sequencing method). In some embodiments, one or two or more types of tags (e.g., different fluorescent labels) are linked to each nucleic acid in a library. In some embodiments, chromosome-specific tags are used to make chromosomal counting faster or more efficient.

In some embodiments, the MIPs are introduced to nucleic acid fragments derived from a test subject (or a reference subject) to perform capture of target sequences or sites (or control sequences or sites) located on a nucleic acid sample (e.g., a genomic DNA). In some embodiments, fragmenting aids in capture of target nucleic acid by molecular inversion probes. In some embodiments, for example, when the nucleic acid sample is comprised of cell free nucleic acid, fragmenting may not be necessary to improve capture of target nucleic acid by molecular inversion probes. For example, in some types of samples, cell free nucleic acid is fragmented in the sample such that further fragmentation is not necessary and may even be detrimental capture of the target nucleic acids. After capture of the target sequence (e.g., locus) of interest, the captured target may be subjected to enzymatic gap-filling and ligation steps, such that a copy of the target sequence is incorporated into a circle-like structure. In some embodiments, nucleic acid analogs, e.g., containing labels, haptens, etc., may be incorporated in the filled section, for use, e.g., in downstream detection, purification, or other processing steps. MIP technology may be used to detect or amplify particular nucleic acid sequences in complex mixtures. One of the advantages of using the MIP technology is in its capacity for a high degree of multiplexing, which allows thousands of target sequences to be captured in a single reaction containing thousands of MIPs.

The term "capture" or "capturing", as used herein, refers to the binding or hybridization reaction between a molecular inversion probe and its corresponding targeting site. In some embodiments, upon capturing, a circular replicon or a MIP replicon is produced or formed.

The term "MIP replicon" or "circular replicon", as used herein, refers to a circular nucleic acid molecule generated via a capturing reaction (e.g., a binding or hybridization reaction between a MIP and its targeted sequence). MIP replicons find particular application in rolling circle amplification, or RCA. RCA is an isothermal nucleic acid amplification technique where a DNA polymerase continuously adds single nucleotides to a primer annealed to a circular template, which results in a long concatemer of single stranded DNA that contains tens to hundreds to thousands of tandem repeats (complementary to the circular template). See, e.g., M. Ali, et al., which is incorporated herein by reference in its entirety, for all purposes. See also WO 2015/083002, which is incorporated herein by reference in its entirety, for all purposes.

The term "amplicon", as used herein, refers to a nucleic acid generated via amplification reaction (e.g., a PCR reaction). An amplicon may be a single-stranded nucleic acid molecule, or a double-stranded nucleic acid molecule. A targeting MIP replicon may be amplified using conventional techniques to produce a plurality of targeting MIP amplicons, which are double-stranded nucleotide molecules. A control MIP replicon may be amplified using conventional techniques to produce a plurality of control MIP amplicons, which are double-stranded nucleotide molecules.

The term "signal" as used herein refers to any detectable effect, such as would be caused or provided by a label or by action or accumulation of a component or product in an assay reaction.

The term "detection" as used herein refers to quantitatively or qualitatively identifying an analyte (e.g., DNA, RNA or a protein), e.g., within a sample. The term "detection assay" as used herein refers to a kit, test, or procedure performed for the purpose of detecting an analyte within a sample. Detection assays produce a detectable signal or effect when performed in the presence of the target analyte.

BRIEF DESCRIPTION OF THE DRAWINGS

Embodiments of the present disclosure will now be described by way of example with reference to the accompanying drawings in which.

where $N_i$ is the number of objects detected when imaging wells that contained fluorophores corresponding to the imaged channel, and $N_j$ is the number of objects detected when imaging wells that contained fluorophores not corresponding to the imaged channel. Note that because the considered unmixing approaches work on emission spectra, channel Alexa 488 was not subject to crosstalk; therefore, the specificity for this channel was perfect (100%) and is not shown.

Figure 14:
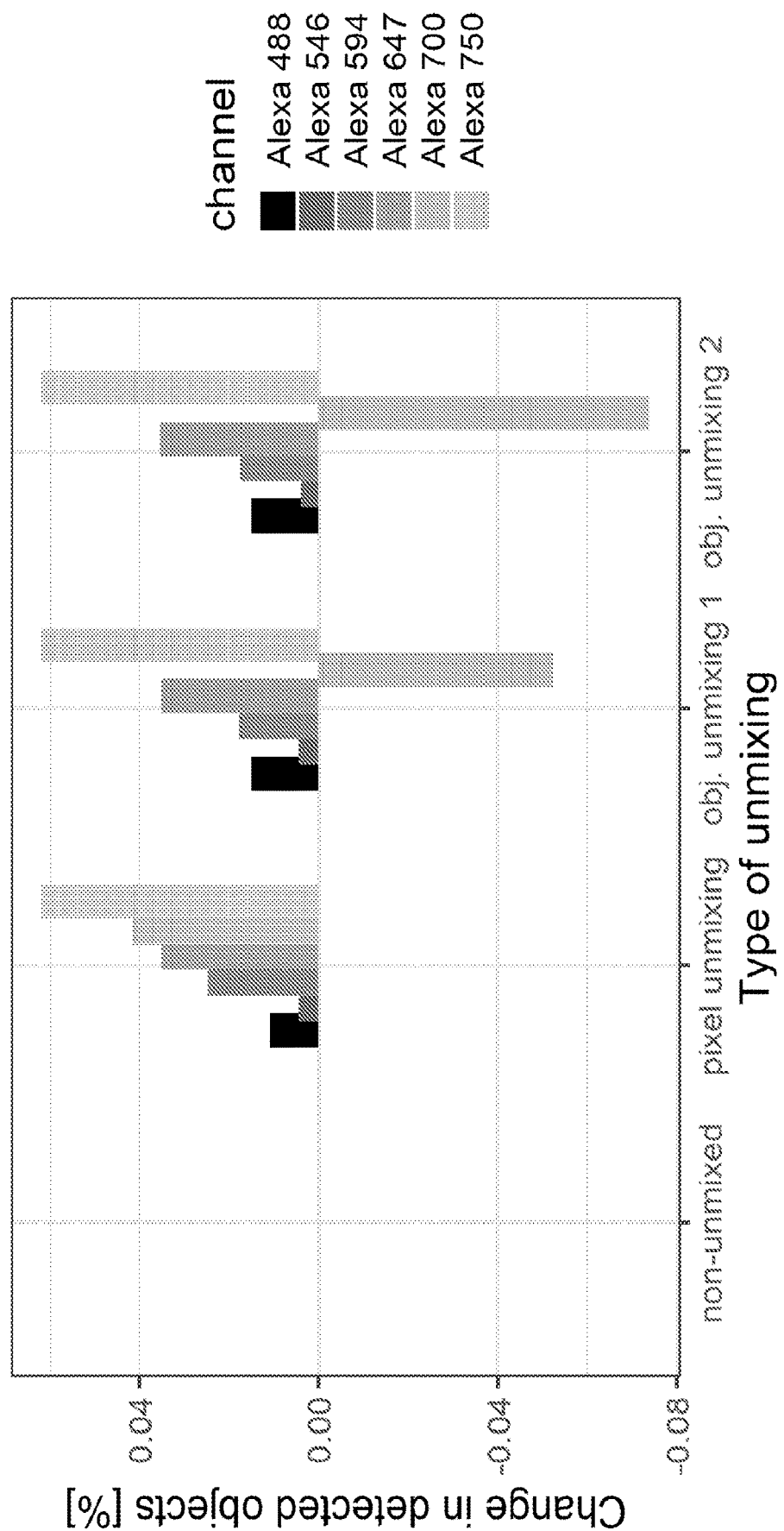

FIG. 14 shows the results of experimental validation of the spectral unmixing processes described herein, in terms of the relative change in the number of objects called compared to a non-unmixed case. For channel i, relative change in the number of called objects was defined as $$100 \cdot \frac{N_{alg} - N_0}{N_0},$$

where $N_0$ is the number of objects per image reported for the non-unmixed case, and $N_{alg}$ is the number of objects per image reported by the specific unmixing process (pixel-unmixing, object-unmixing 1 (hard threshold), or object-unmixing 2 (soft threshold)).

Where the figures laid out herein illustrate embodiments of the present invention, these should not be construed as limiting to the scope of the invention. Where appropriate, like reference numerals will be used in different figures to relate to the same structural features of the illustrated embodiments.

DETAILED DESCRIPTION OF THE INVENTION

The present invention provides a solution to the problem of dealing with spectral crosstalk in analysis of images of samples, such as images from fluorescence imaging systems (e.g. fluorescence microscope images) or images from optical imaging systems (e.g. optical microscope images). The present invention produces segmented images in which objects associated with different sources of electromagnetic signals are identified with high accuracy despite the presence of spectral crosstalk and even when the resolution of the image is such that structures associated with different sources of electromagnetic signals physically co-locate within pixels.

Figure 1:
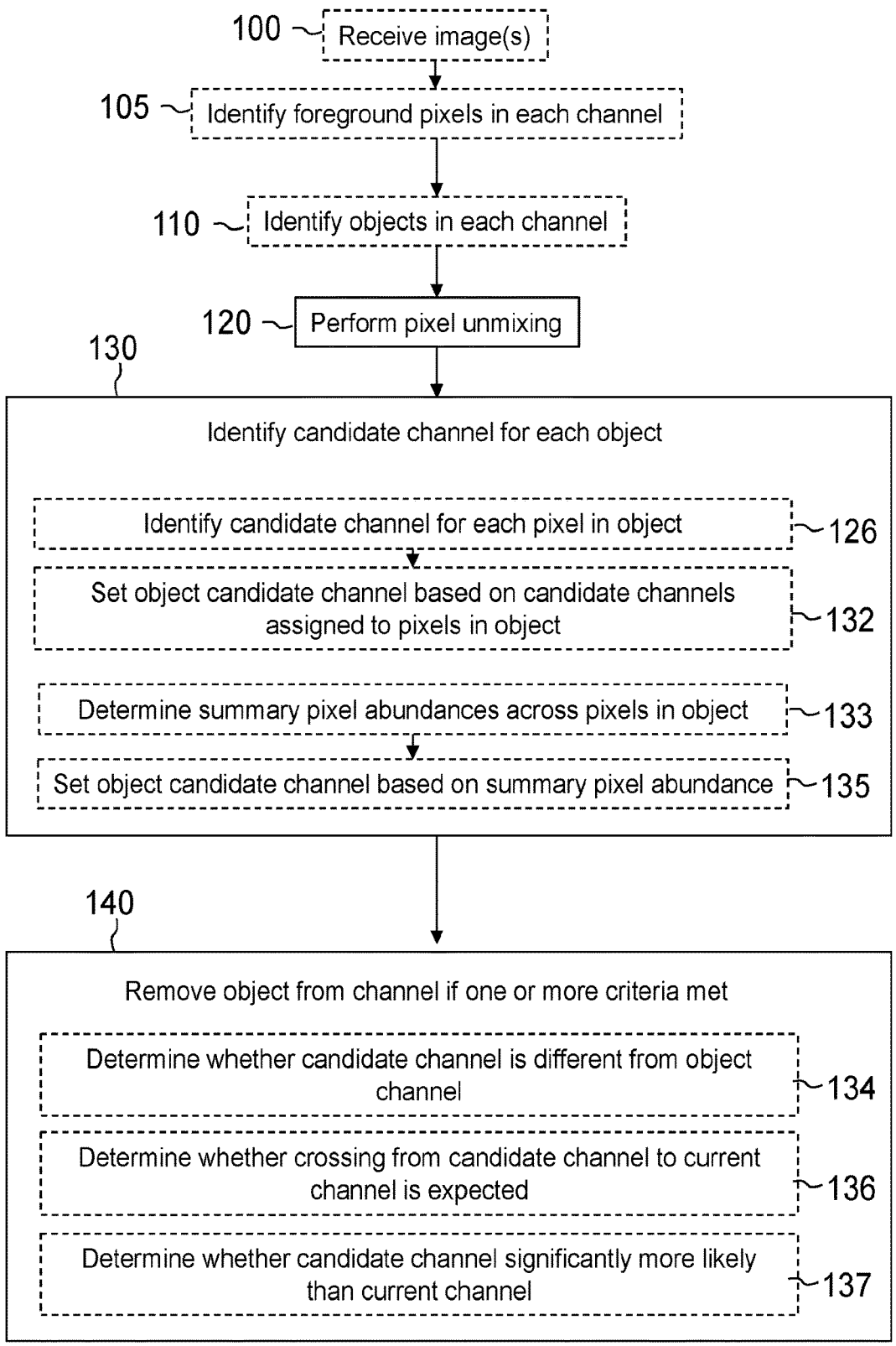
FIG. 1 provides a flowchart illustrating a general method of processing images.

FIG. 1 provides a flowchart illustrating a general method of processing images. At optional step 100, image data is received or otherwise obtained by a computing device configured to implement the methods described herein. The image data may comprise a plurality of single channel images of an area of a sample. As used herein, images of the same area of a sample refer to a set of images that show at least one area in common between the plurality of images. Such images may have been acquired, for example, by imaging the same area of a sample, with a plurality of wavelengths (also referred to herein as "color" or "channel") settings (e.g. maintaining the same focal field but changing the color filter settings). As the skilled person understands, a set of images may be in the form of separate, corresponding, single-color images (also referred to herein as single channel images), or in the form of one or more multi-color images, each color in such a multi-color image corresponding to a channel.

At step 110, sets of pixels that form objects are identified in each single channel image individually (segmentation). Because the objects are identified in each image independently, they can also be referred to as "channel-specific objects", to reflect the fact that the objects are defined based on information associated with a single channel. Any segmentation method known in the art may be used at step 110. It is particularly convenient to use segmentation methods that output data comprising a map (typically a matrix where each element corresponds to a pixel in the segmented image) where each segmented object is assigned a unique label. Where segmented objects are not assigned a unique label by default, the method may comprise assigning a unique label to each segmented object. Further, step 110 may have been performed prior to commencing the method of the present invention. As such, step 110 may be optional and the step of receiving images (step 100) may comprise receiving previously segmented images.

Step 110 may be preceded by optional step 105, in which foreground pixels are identified in each channel, individually or collectively. Typically, step 110 is performed for each channel individually. This may be advantageous for example when the level of noise (i.e. background signal) varies depending on the channel. In embodiments, foreground pixels are identified as part of the segmentation process (step 110). Advantageously, image segmentation may be performed using foreground pixels, such that objects only include foreground pixels. The step of identifying foreground pixels may be performed individually for each single channel image. Alternatively, the step of identifying foreground pixels may be performed collectively for a plurality of single channel images, such as e.g. a plurality of single channel images associated with the same channel. For example, a plurality of single channel images that are associated with the same sample may be analyzed collectively to identify foreground pixels. Identifying foreground pixels may be performed by thresholding. Any thresholding method known in the art may be used. The present inventors have found local (adaptive) thresholding to be particularly advantageous in the context of the present disclosure. Identifying foreground pixels may comprise setting background pixels to a predetermined value. The predetermined value is suitably lower than the intensity of all foreground pixels. For example, background pixels intensities may be set to 0 (effectively ensuring that these pixels are ignored from subsequent steps), or a predetermined value that is representative of background signal, such as e.g. the average, median, mode, or a predetermined percentile value of the signal in background pixels.

Identifying foreground pixels in a subject single channel image at step 105 may comprise defining a threshold on the difference between pixel intensities and corresponding neighborhood pixel intensities, using one or more corresponding negative control image(s). The threshold may then be applied to the pixels in the subject image, by identifying a pixel as foreground if the differences between the pixel intensity and the corresponding neighborhood pixel intensities is at or above the threshold. Defining a threshold that applies to the difference between pixel intensities and corresponding neighborhood pixel intensities may comprise obtaining the distribution of differences between pixel intensities and corresponding neighborhood pixel intensities in the one or more negative control images, and identifying the threshold as a percentile value in said distribution. For example, the threshold may be set to the $x^{th}$ percentile of the distribution of pixel neighborhood intensity offsets, where x may be 95%, 96%, 97%, 98%, 99%, 99.5%, 99.9%, 99.99%, 99.999%, etc. The inventors have found a 99.999% percentile threshold to be convenient. As the skilled person understands, the choice of threshold may depend in the characteristics of the images that are being processed, such as e.g. the amount of background signal in the negative control images and the subject images, the desired stringency of the thresholding process, etc. Therefore, the present invention is not limited in this regard.

At step 120, pixel unmixing is performed. Pixel unmixing is performed using the data from all channels. Optionally, pixel unmixing is performed after normalisation of the signal in each pixel. For example, for each pixel that is unmixed, the signal intensities for the plurality of channels may be normalised such that they sum to 1. This may be performed by obtaining normalised intensities for a pixel in each channel i as $$c_i / \sum_{i=1}^{n} c_i,$$

where $[c_1, \ldots c_n]$ is a vector of measured intensities at the pixel for each of the n channels. Pixel unmixing may be performed for each pixel (i.e. all pixels in the images). Alternatively, pixel unmixing may be performed only for each foreground pixel, or for each pixel that forms part of an identified object (the two options being equivalent in particular embodiments where the segmentation method used assigns each foreground pixel to an object). Alternatively, pixel unmixing may be performed only for each pixel that forms part of at least two identified objects, or for each pixel that forms part of at least two identified objects that were not identified in the same channel. These two options may be equivalent in embodiments where the segmentation method used assigns each pixel in a single channel image to only one object (i.e. no overlapping objects within a single channel image). Pixel unmixing is preferably performed for each pixel individually (i.e. independently). Pixel unmixing may be performed using any method known in the art, provided that the method results in the determination of estimated abundances of the signal in the respective channels, in each of said unmixed pixels. In particular, pixel unmixing may be performed using any non-blind spectral unmixing method known in the art. The present inventors have found linear unmixing to be particularly suitable. However, nonlinear unmixing may also be used.

At step 130, a candidate channel is identified for each object, based on the estimated abundances for the pixels in the respective object. The candidate channel is one of the plurality of channels in the data. Identifying a candidate channel as one of the plurality of channels may optionally comprise assigning a single channel to each pixel in the object (step 126) and assigning the single channel to the object based on the candidate channels assigned to the pixels in the object (Step 132). For each unmixed pixel, the single channel assigned at step 126 may be based on the estimated abundances for the pixel. For example, assigning a single channel to each unmixed pixel in the object may comprise assigning the single channel that is associated with the highest estimated abundance for the respective unmixed pixel. In addition to unmixed pixels, objects may comprise pixels that were not unmixed. For example, pixels that only form part of one of said identified objects may not have been unmixed. These may be associated with a single channel which is the (only) channel in which the object was identified. Pixels that have not been unmixed may also (i.e. instead or alternatively) be associated with a set of estimated abundances. For example, the estimated abundance for the channel in which the object was identified may be set to a predetermined high value (e.g. 1 or any value that is higher than the value for all other channels, such as e.g. a value that is proportional to the signal in the channel at that pixel), and the estimated abundances for all other channels may be set to a predetermined low value (e.g. 0 or any other value that is lower than the value set for the channel in which the object was identified, such as e.g. a value that is proportional to the background signal in the respective channels). Thus, the single channel assigned at step 126 may be based on the estimated abundances for pixels that have been unmixed as well as pixels that have not been unmixed. The single channel assigned to the object at step 132 may be the channel that is associated with the highest number of pixels in the object. Any other voting scheme may be used to assign a single channel at step 132, on the basis of the single channels of step 126.

Alternatively, identifying a candidate channel as one of the plurality of channels may optionally comprise determining a set of summarized estimated abundances for the object (step 133), and assigning the single channel to the object based on the summarized estimated abundances (step 135). The summarized estimated abundances for the object may be based on the estimated abundances for the pixels in the objects. Step 133 may be performed for each object, for each object comprising at least one unmixed pixel, or for each object comprising at least one pixel that is associated with estimated abundances. Determining a set of summarized abundances for an object may comprise associating estimated abundances for all pixels that have not been unmixed. For example, estimated abundances for a pixel that has not been unmixed can be obtained as explained above, by: setting a high value for the estimated abundance for the channel in which the object to which the pixel belongs was identified, and setting a predetermined low for the estimated abundances for all other channels. A set of summarized estimated abundances for an object may be obtained as a measure of centrality of the estimated abundances for the pixels in the object. Suitable measures of centrality may be chosen from: a channel-wise average (also referred to herein as "center of mass", COM), channel-wise median, channel-wise trimmed average, channel-wise filtered average, and channel-wise mode. The present inventors have found the channel-wise average of the estimated abundances of the pixels in the object to perform well. Step 135 may comprise assigning the single channel that is associated with the highest summarized estimated abundance as the candidate channel for the object.

At step 140, a decision is made to remove (or not to remove) an object from the results of the image segmentation step. This decision is made based at least in part depending on whether the candidate channel is different from the channel in which the object was identified. The process of reviewing the objects and deciding whether to remove them results in updated image segmentation results. These updated image segmentation results may be used for any intended downstream analysis. For example, the objects in each channel may be counted, further analysed, displayed, etc. Further, the updated image segmentation results may be used to generate new images where objects that have been removed are set to e.g. a background value. In other words, the updated segmentation results may be used as a mask to display the image data in such a way that only pixels that are part of objects in the updated segmentation results appear as containing signal. In particular, at step 140, an object is removed from the results of the image segmentation step if one or more conditions(s) are satisfied, the one or more condition(s) comprising: (i) the candidate channel being different from the channel in which the object was identified, (ii) the source of a signal associated with the candidate channel being a source that is known to produce a signal in the channel in which the object was identified, and (iii) the relative likelihood of the object belonging to the candidate channel and the channel in which the object was identified being above a predetermine threshold. Thus, step 140 may comprise one or more of the optional steps of (i) determining whether the candidate channel is different from the channel in which the object was identified (step 134), (ii) determining whether crossing from the candidate channel to the current channel (the channel in which the object was identified) is expected (step 136), and (iii) the step of determining whether the candidate channel is significantly more likely than the current channel (step 137).

Determining whether the candidate channel is significantly more likely than the current channel may comprise determining the likelihood of the object belonging to the candidate channel, and determining the likelihood of the object belonging to the channel in which the object was identified. These may be used to determine the relative likelihood of the object belonging to the candidate channel and the channel in which the object was identified, which may be obtained in the form of an odds ratio. A suitable predetermined threshold for the odds ratio may be chosen depending on the context, for example the desired stringency of the object removal process. For example, an odds ratio threshold of 1 indicates that the candidate channel is more likely than the current channel. Odds ratio thresholds above 1 indicate that stronger evidence in favour of the candidate dye is necessary before an object can be removed (i.e. identified as a crossing object). For example, a predetermined threshold of 1, 1.1, 1.2, 1.3, 1.4, 1.5, 2, or 2.5 may be used. Determining whether the candidate channel is significantly more likely than the current channel may be performed by comparing the relative likelihood to a predetermined threshold. The likelihood of the object belonging to the candidate channel may be determined based on the estimated abundances of the candidate channel for the pixels in the object. For example, the likelihood of the object belonging to the candidate channel may be determined using a summarized estimated abundance for the object, in the candidate channel, the summarized estimate abundance for the object being based on the estimated abundances for the pixels in the object. The likelihood of the object belonging to the channel in which the object was identified may similarly be determined based on the estimated abundances of the channel in which the object was identified, for the pixels in the object. For example, the likelihood of the object belonging to the channel in which the object was identified may be determined using a summarized estimated abundance for the object, in the channel in which the object was identified, the summarized estimate abundance for the object being based on the estimated abundances for the pixels in the object. In particular, the likelihood of the object belonging to a channel (e.g. the channel in which the object was identified or the candidate channel) may be computed as: (1—summarized estimated abundance for the object, in the respective channel)/(summarized estimated abundance for the object, in the respective channel). This may be expressed as $$\frac{(1-\widehat{p_n^c})}{\widehat{p_n^c}}$$

where $\widehat{p_n^c}$ is the summarized estimated abundance for the object, in the subject channel.

A source of signal may be known to produce a signal in a particular channel if the source has an emission spectrum in the wavelength(s) associated with the particular channel. Thus, the step of determining whether crossing from the candidate channel to the current channel (the channel in which the object was identified) is expected (step 136) may comprise using prior knowledge of the emission spectra of the respective sources, and the wavelength(s) associated with the channel in which the object was identified, to determine whether crossing from the candidate channel to the current channel is possible. Where a spectral unmixing matrix is available, this matrix may comprise coefficients that capture prior knowledge of the emission spectra of the respective sources, at the wavelength(s) associated with the channel in which the object was identified. As such, a spectral unmixing matrix alone may be used to verify this condition. Thus, a source of signal may be known to produce a signal in a particular channel if a spectral unmixing matrix used in the pixel unmixing step has a non-zero coefficient corresponding to crossing between the candidate channel and the channel in which the object was identified (i.e. a non-zero coefficient $a_{ij}$ for a source j in relation to the channel i, where source j is different from the sources i associated with the channel i in which the object was identified).

Further, sub-steps/conditions (ii) and (iii) of step 140 above may each implicitly include the determination of whether the candidate channel is different from the channel in which the object was identified. For example, verifying condition (iii) may implicitly also determine whether the candidate channel is different from the channel in which the object was identified. Indeed, where the candidate channel is the same as the channel in which the object was identified, the two likelihoods being compared in a relative likelihood should be identical. As such, applying a predetermined threshold of 1 effectively prevents objects from being removed when the candidate channel is the same as the channel in which the object was identified. Thus, step 134 may in practice not be performed independently from steps 136 and/or 137. Embodiments that make use of sub-step/ condition (iii) (step 137) are referred to herein as "soft object unmixing". This is because these embodiments require a certain level of confidence (depending e.g. on the threshold that is applied to the relative likelihood of the candidate and current channels) in the evidence for spectral crossing, before removing an object. An example of such an embodiment is described by reference to FIG. 3 below. By contrast, embodiments that do not make use of sub-step/condition (iii) (step 137) are referred to herein as "hard object unmixing". An example of such an embodiment is described by reference to FIG. 2 below.

In embodiments, the results of the image segmentation step comprise a segmentation map where pixels in objects are labelled differently from pixels not in objects. In such embodiments, removing an object from the results of the image segmentation step may comprise re-labelling the pixels that form the object to be removed, in the segmentation map. For example, the pixels of the object to be removed may be assigned a label that matches the label used for pixels that are not in objects. For example, pixels in objects may be labelled with a non-zero value, and pixels not in objects may be labelled with a zero. The segmentation map may be a binary map, where pixels in objects are labelled with a "1" and pixels not in objects are labelled with a "0". When thresholding is performed, such that objects only comprise foreground pixels, removing an object from the results of the segmentation map is equivalent to labelling the pixels of the object as background. Similarly, removing an object from the results of the image segmentation step may comprise producing an image corresponding to the original image, but where the pixels of the objects to be removed are set to a predetermined value associated with background pixels.

In embodiments, the method further comprises the optional step of re-running the image segmentation step after all objects in an image have been processed. The segmentation step may be wholly or partially re-run. For example, the remaining objects may simply be assigned new unique labels. Alternatively, segmentation may be re-run without repeating a thresholding step, with the updated assignment of pixels to foreground and background (where pixels from removed objects, initially labelled as foreground, have been relabeled as background). This may be advantageous for consistency in downwards processing steps. In embodiments, the method further comprises the step of outputting to a user, using a user interface, the updated image segmentation results for at least one of the single channel images. The outputting may comprise displaying the updated image segmentation results overlaid on the corresponding single channel image. The outputting may alternatively comprise displaying at least one new image that has been produced using the updated segmentation results. For example, a new image may be obtained by setting all pixel intensities not in objects in corresponding updated segmentation results to a background value (e.g. 0 or a low value).

Figure 2:
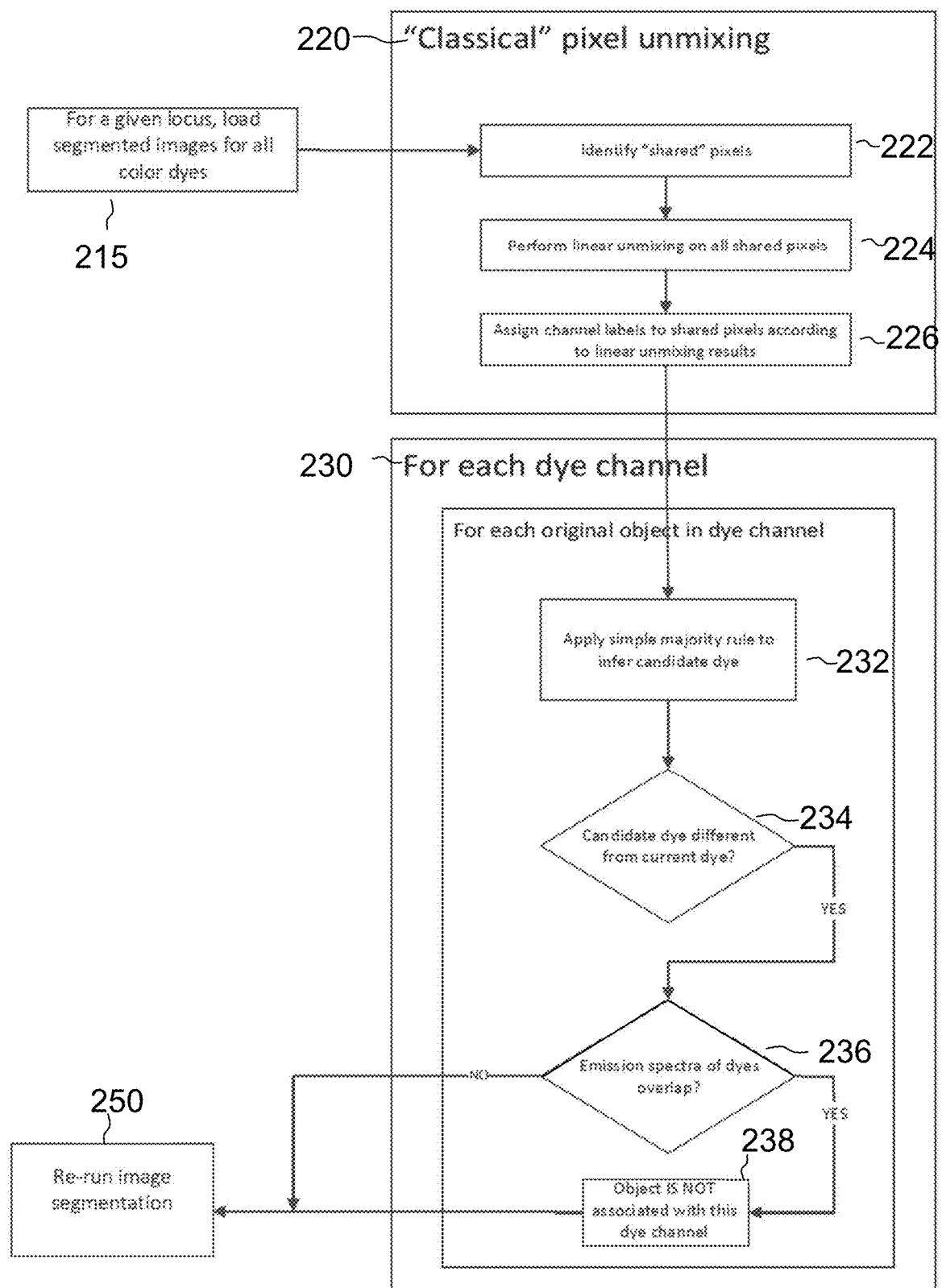
FIG. 2 provides a flowchart illustrating a method of processing images comprising a hard object unmixing step.
Figure 3:
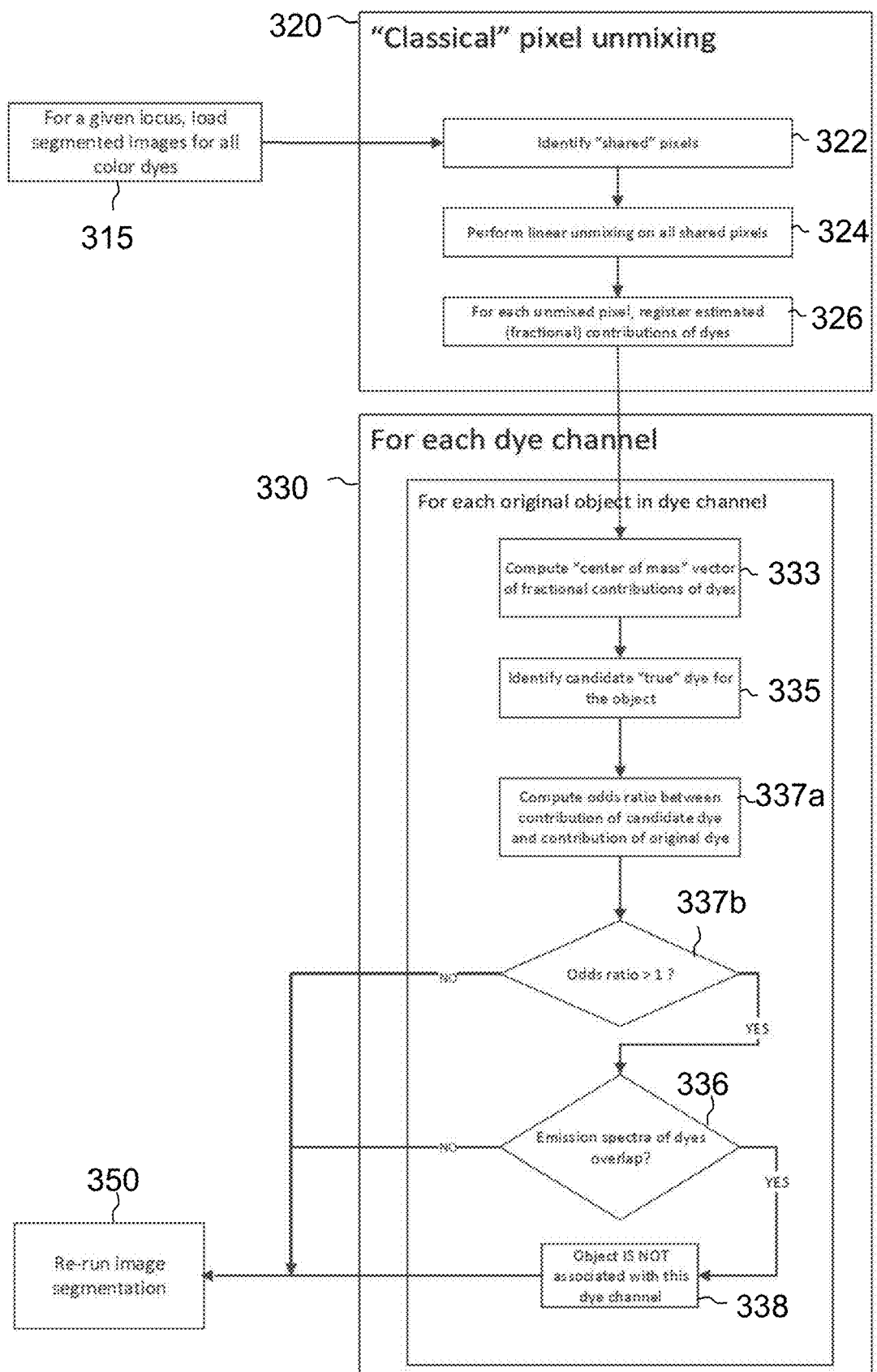
FIG. 3 provides a flowchart illustrating a method of processing images comprising a soft object unmixing step.

FIG. 2 provides a flowchart illustrating an example of a method of processing images comprising a hard object unmixing step, while FIG. 3 provides a flowchart illustrating an example of a method of processing images comprising a soft object unmixing step. The methods of FIGS. 2 and 3 both start with the step of loading segmented images for all color dyes (i.e. for one or more channels, also referred to below as "dye channels" as each of a plurality of sources of electromagnetic signal such as e.g. fluorescent/luminescent/ color labels can be associated with at least one of the channels, and conversely each channel is preferably associated with one of the sources of electromagnetic signal) for a given locus (i.e. area of a sample) (steps 215, 315). Both methods proceed with the step of performing pixel unmixing (steps 220, 320), which in those embodiments comprise the steps of identifying shared pixels (steps 222, 322), and performing linear unmixing on all shared pixels (steps 224, 324) using given (known) dye spectra (i.e. using given dye spectra to perform "classical" linear unmixing). Shared pixels are those that are identified as foreground in more than one dye channel. In the method of FIG. 2, a candidate channel is then assigned to each shared pixel using the results of the linear unmixing, at step 226. This concludes the pixel unmixing process in this method. At the end of this step, all pixels are unmixed: all shared pixels have been assigned a candidate channel and all other foreground pixels are already assigned a single channel. In the method of FIG. 3, the estimated (fractional) contributions of each of the dyes (estimated abundances) resulting from the linear unmixing step are recorded at step 326. These values are normalized (summing to 1) and may be stored as a vector for each unmixed pixel. This concludes the pixel unmixing process in this method. At the end of this step, all pixels are unmixed: all shared pixels have been associated with a vector of estimated fractional contributions of dyes (which are normalized to add up to 1), and all other foreground pixels are associated with a single channel (with a fractional contribution of 1 for that channel and 0 for all others).

Both methods then proceed to the object unmixing step 230, 330, where each object in each dye channel is individually assessed to identify whether the object should be removed. In the embodiment of FIG. 2, object unmixing starts at step 232 by assigning a candidate dye to the object under assessment, using a majority rule. As a result, the dye with the strongest presence in the object is considered to be the "true dye". At step 234, a check is performed to ensure that the candidate dye is different from the current dye, which is a pre-requisite for a "crossing" object to be identified. At step 236, a further check is performed to ensure that the emission spectra of the candidate and current dyes overlap (i.e. the dye associated with the candidate channel is expected to emit in the current channel). This is a further pre-requisite for a "crossing" object to be identified. If both checks (steps 234, 236) are satisfied (i.e. the conditions checked at steps 234 and 236 both hold), then the object is removed from the current channel at step 238. This concludes the object unmixing step (preferably when all objects have been assessed as described).

In the embodiment of FIG. 3, object unmixing starts at step 333 by computing the "center of mass" vector of fractional contribution of dyes (obtained at step 324, stored at step 326) for all pixels in the object under assessment. This represents a "summarized vector of fractional contribution of dyes" for the object. This is obtained by averaging fractional vectors over all object pixels. At step 335, a candidate dye is assigned to the object under assessment, as the dye that has the strongest fractional presence in the summarized vector of fractional contribution of dyes. This also results in the dye with the strongest presence in the object being considered to be the "true dye". Thus, steps 326, 333 and 335 may be used in the method of FIG. 2 instead of steps 226, 232. At step 337*a*, an odds ratio that compares the contribution of the candidate dye and the contribution of the current dye is computed. At step 337*b*, a check is performed to ensure that the candidate dye is more likely to be the "true dye" than the current dye, by comparing the odds ratio to a predetermined threshold. The threshold may be chosen as 1, indicating that the candidate dye is more likely to be the "true dye" than the current dye (i.e. the odds are higher that the candidate dye has stronger presence than the original dye). At step 336, a further check is performed to ensure that the emission spectra of the candidate and current dyes overlap (i.e.

the dye associated with the candidate channel is expected to emit in the current channel). If both checks (steps 336, 337b) are satisfied (i.e. the conditions checked at steps 337b and 336 both hold), then the object is removed from the current channel at step 338. This concludes the object unmixing step (preferably when all objects have been assessed as described). Note that the order of the checks 337b-336, 334-336 is irrelevant and either check may be performed first. In the embodiments shown on FIGS. 2 and 3, the object unmixing step 230/330 is followed by an optional step of re-running image segmentation (steps 250, 350).

Systems

Figure 4:
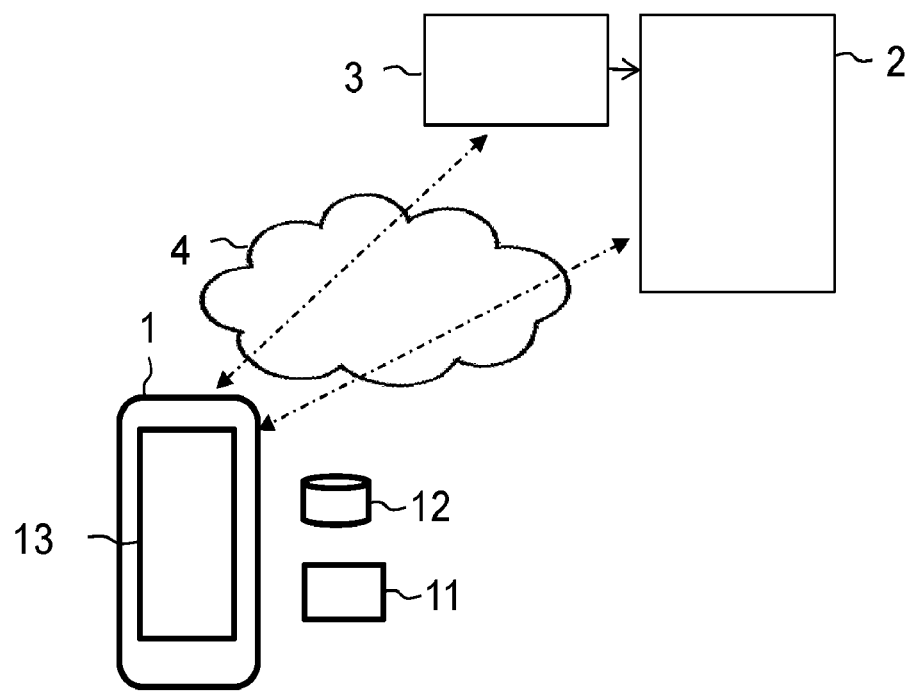
FIG. 4 provides a schematic illustration of a system suitable for implementing a method of processing images.

FIG. 4 shows an embodiment of a system for processing images according to the present disclosure. The system comprises a computing device 1, which comprises a processor 11 and computer readable memory 12. In the embodiment shown, the computing device 1 also comprises a user interface 13, which is illustrated as a screen but may include any other means of conveying information to a user such as e.g. through audible or visual signals. The computing device 1 is communicably connected, such as e.g. through a network, to image acquisition means 3, such as a microscope, and/or to one or more databases 2 storing image data. The image acquisition means is preferably a multichannel image acquisition means, such as e.g. a microscope equipped with a plurality of dye filters, a colour camera, etc. The particular configuration of the image acquisition may depend at least in part on the sample to be imaged and the sources of electromagnetic signals to be detected. The computing device may be a smartphone, tablet, personal computer or other computing device. The computing device is configured to implement a method for processing images, as described herein. In alternative embodiments, the computing device 1 is configured to communicate with a remote computing device (not shown), which is itself configured to implement a method of processing images, as described herein. In such cases, the remote computing device may also be configured to send the result of the method of processing images to the computing device. Communication between the computing device 1 and the remote computing device may be through a wired or wireless connection, and may occur over a local or public network such as e.g. over the public internet. The image acquisition means may be in wired connection with the computing device 1, or may be able to communicate through a wireless connection, such as e.g. through WiFi, as illustrated. The connection between the computing device 1 and the image acquisition means 3 may be direct or indirect (such as e.g. through a remote computer). The image acquisition means 3 are configured to acquire image data for samples, for example for the detection of labelled structures in a sample, which labelled structures may be located on a surface. Any surface that is suitable to detect labelled structure in the particular image acquisition means used is envisaged. For example, in the context of molecular counting, detection can be performed on a surface, e.g., a glass, gold, or carbon (e.g., diamond) surface. In some embodiments, signal detection is done by any method for detecting electromagnetic radiation (e.g., light). In some embodiments, signal detection is done using a method selected from far-field optical microscopy, near-field scanning optical microscopy, epi-fluorescence microscopy, confocal microscopy, two-photon microscopy, optical microscopy, and total internal reflection microscopy, where the target structure (such as e.g. target molecule) is labelled with an electromagnetic radiation emitter. Thus, the image acquisition means may comprise a far-field optical microscope, a near-field scanning optical microscope, an epi-fluorescence microscope, a confocal microscope, a two-photon microscope, an optical microscope, or a total internal reflection microscope. In convenient embodiments, the image acquisition means comprises a confocal microscope. In particular, the image acquisition means may be configured to acquire fluorescence images. Other methods of microscopy are also appropriate, as are methods for detecting electromagnetic radiations (including in particular radiations in the visible, ultraviolet or infrared ranges) that do not rely on microscopy. In some embodiments, it may not be necessary to actively label the target. For example, the target may comprise a source of electromagnetic radiation (i.e. a label). Alternatively, labels that can be detected by the chosen image acquisition system can be used to actively label a target. In some embodiments, image data acquisition comprises surface reading by detecting fluorescent clusters using an imaging system such as an ImageXpress imaging system (Molecular Devices, San Jose, CA), and similar systems.

Applications

The present methods may find use in any context where it is desirable to determine whether two or more different sources of electromagnetic signal are occupying two different physical spaces corresponding to two different pixels (i.e. in identifying two different sources of electromagnetic signal as two separate objects) Additionally, the present methods may find use in any context where it is desirable to determine whether two or more different sources of electromagnetic signal are occupying the same pixel and are therefore co-localizing. While the present methods are exemplified within the context of microscopy images, such as, in particular, fluorescence microscopy images, the methods are also applicable in the context of analyzing any other types of images that have the above-mentioned properties. In other words, the present methods are not limited in relation to the particular imaging system or type of images that are being analysed, provided that these images may include signal associated with spectral mixing. In particular, the present methods are not limited to microscopy images or fluorescence microscopy images, although they may be particularly beneficial in this context.

The methods described herein are particularly advantageous in contexts where multiple sources of different electromagnetic signals are not expected to (fully) occupy the same physical space. In other words, the methods described herein are particularly advantageous where a plurality of structures are analyzed, the structures occupying different or partially overlapping physical spaces, at least some of the structures being associated with different electromagnetic signals. In such cases, the present methods can be used to identify objects that correspond to said structures, even in the presence of cross-talk between the signals associated with the respective structures, and when the imaging resolution is such that some of the pixels in the image may contain signal from a plurality of said structures.

The methods described herein may also find use in contexts where multiple sources of different electromagnetic signals are expected to occupy the same physical space. In other words, the methods described herein may be used where a plurality of structures are analyzed, at least some of the structures being associated with different electromagnetic signals and occupying the same physical space(s). Indeed, in such contexts, the methods described herein can be used to identify objects that correspond to said structures, even in the presence of cross-talk between the signals associated with the respective structures, and even when the structures (and hence the objects associated with the structures in the images) mostly or fully overlap. This is in particular the case provided that: (i) only one of the imaging channels is subject to cross-talk (e.g. a first structure is associated with signal in a first channel, and one or more further structures that co-localize with the first structure are each associated with signals in respective further channels, and also optionally in the first channel), and (ii) the true intensity (i.e. the estimated abundance from unmixing) of the signal in the first channel for the object, is higher than the true intensity of the signal in the other channels. Indeed, in such cases the object identified in the first channel will be correctly labelled as a true object (i.e. it will not be removed), and the object(s) in the further channel(s) will also be labelled as true object(s) (i.e. will not be removed) because there is no cross-talk from the first structure to the further channels (and hence the objects in the further channel(s) will not be removed despite the signal in these channels being lower than in the first channel).

As an example, a structure may be associated with a first fluorescent dye that emits in a first channel, but does not emit in a second channel. Another structure may be associated with a second fluorescent dye that emits in the second channel as well as the first channel. If the structures co-localize, a single channel image for the first channel will show an object that comprises pixels with intensities reflecting the presence of both the first and the second structures. A single channel for the second channel will also show an object comprising the same pixels, with intensities reflecting the presence of the second structure only. After pixel unmixing, each pixel will be associated with an estimated abundance in each of the channels. The object in the first channel will then be associate with a candidate channel, which will be the first channel if the estimated abundances across pixels in the object are dominated by the first channel. The object in the first channel will therefore not be removed. The object in the second channel will then also be associated with a candidate channel, which will also be the first channel. However, by checking whether cross-talk between the first channel and the second channel is expected (i.e.

whether the first fluorophore is expected to also emit in the second channel), embodiments of the method will correctly identify that the object in the second channel should not be removed (in other words, that any signal in the second channel indicates the presence of the second fluorophore, rather than cross-talk from the first fluorophore).

Referring to the first channel as the "right" channel and the second channel as the "left" channel (where "left" and "right" can refer to the relative positions of the wavelengths ranges captured by the channels, "left" referring to lower wavelengths than "right"), and assuming that objects cross from a left channel to a right channel, the present methods may be particularly useful for co-localizing objects where the true intensity of the object in the "right" channel (into which the spectrum from the "left" channel crosses) is higher than the true intensity of the object in the "left" channel. This is equivalent to stating that a weak-intensity object in the "right" channel that potentially co-localizes with a strong-intensity object in the "left" channel may be marked as "crossing" by the present methods (because its estimated intensity abundance will be lower than the estimated intensity abundance of the object in the "left" channel), whereas a high-intensity object in the "right" channel that potentially co-localizes with a low-intensity object in the "left" channel will not be marked as "crossing" by the present methods.

The above tasks of defining co-localizing or non-colocalizing objects associated with different electromagnetic signals (e.g. different fluorescent dyes) may be desirable in the context of detection of cellular structures, detection and/or counting of labelled microorganisms (e.g. bacteria) or cells, detection and/or counting of labelled molecules or molecular complexes, or generally in the context of the detection of any structure (particularly a micro or nanostructure, in the context of microscopy) that can be associated with a detectable electromagnetic signal such as e.g. by virtue of comprising or being tagged with a source of electromagnetic signal such as a fluorescent label, a luminescent label, a colorimetric label, etc. Further, the ability to identify co-localizing structures may be particularly useful in the context of identifying co-localizing proteins or other cellular or molecular structures, etc. (see e.g. Am J Physiol Cell Physiol. 2011 April; 300(4): C723-C742. Published online 2011 Jan. 5. doi: 10.1152/ajpcell.00462.2010). Thus, the present disclosure also relates to method for identifying and/or counting labelled structures in a sample, the method comprising: receiving image data comprising a plurality of single channel images of an area of the sample, wherein the labelled structures are associated with an electromagnetic signal in at least one of the channels; performing image segmentation of each single channel image individually, to identify sets of pixels that form objects; performing pixel unmixing at least for pixels that form part of at least two of said identified objects, to determine the estimated abundance of the signal in the respective channels, in each of said unmixed pixels; for each of said identified objects: identifying a candidate channel as one of the plurality of channels, based on the estimated abundances for the pixels in the respective object; removing the object from the results of the image segmentation step if one or more conditions(s) are satisfied, the one or more condition(s) comprising: the candidate channel being different from the channel in which the object was identified, thereby obtaining updated image segmentation results; and optionally counting the number of objects in the at least one channel in which the labelled structures are associated with an electromagnetic signal, in the updated image segmentation results, wherein the number of objects in the at least one channel represents the number of labelled structures in the area of the sample.

The labelled structures may comprise a plurality of sets of differently labelled structures, each set of differently labelled structures being associated with an electromagnetic signal in a respective at least one of the channels. Counting the number of objects may comprise counting the number of objects individually in the respective at least one channel in which a set of labelled structures is associated with an electromagnetic signal, in the updated image segmentation results, wherein the number of objects in the respective at least one channel represents the number of labelled structures in the respective set, in the area of the sample.

The method may further comprise obtaining image data of an area of the sample, the image data comprising a plurality of single channel images of an area of the sample. The method may further comprise repeating the method with a different area of the sample. The method may further comprise obtaining the sample by labelling structures in the sample with one or more dyes, such as fluorescent dyes. The labelled structures may be molecules or groups of molecules. For example, the labelled structure may be rolling circle amplification (RCA) products. The labelled structured may be labelled microorganisms or cells. For example, the labelled structures may be bacteria. For example, a plurality of different types of bacteria may be labelled with respective dyes. This may be useful, for example to identify and optionally quantify the different types of bacteria that may be present in a sample. As another example, a plurality of different types of cells may be labelled with respective dyes. This may be useful, for example to identify and optionally quantify the different types of cells that may be present in a sample. The labelled structures may be labelled subcellular structures, such as e.g. organelles intracellular vesicles, molecular complexes, etc. Further, the structures need not be biological or biochemical and may be e.g. non-organic.

In some embodiments, the technologies provided herein may be used to count the number of copies of a specific nucleic acid or protein in a sample or portion of a sample in a digital manner, i.e., by detecting individual copies of the molecules, without use of a sequencing step (e.g., a digital or "next gen" sequencing step). Such technologies find use for measuring target molecules such as nucleic acid molecules in any kind of sample, including but not limited to, e.g., samples collected for from a subject for diagnostic screening. Embodiments of the technology provided herein find use in, for example, non-invasive prenatal testing (NIPT) and other genetic analysis. In such contexts, the detection may comprise one or more steps of nucleic acid extraction, MIP probe design, MIP amplification/replication, and/or methods for measuring signal from circularized MIPs. In preferred embodiments, the technology provides methods for immobilizing MIPs on a surface and detecting immobilized MIPs. In preferred embodiments, immobilized MIPs are detected using rolling circle amplification.

The methods described herein may be used in the context of detection of a target-recognition event, such as a target-detection event comprising hybridization of a target nucleic acid, e.g., a sample of patient DNA, to another nucleic acid molecule, e.g., a synthetic probe. The target recognition event may create conditions in which a representative product is produced (e.g., a probe oligonucleotide that has been extended, ligated, and/or cleaved), the product then being indicative that the target is present in the reaction and that the probe hybridized to it. Detection of target nucleic acids may be useful for detecting and counting mutations, insertions, deletions, single nucleotide polymorphisms (SNPs), and epigenetic variations in methylation (e.g., variations in methylation of particular CpG dinucleotides by analysis of DNA treated with a reagent that converts unmethylated cytosines to uracils, thereby creating detectable sequence variations that reflect cytosine methylation variations in target DNAs).

A molecular inversion probe may contain first and second targeting polynucleotide arms that are complementary to adjacent or proximal regions on a target nucleic acid to be detected, with a polynucleotide linker or "backbone" connecting the two arms. In the presence of a complementary target nucleic acid, the MIP can be circularized to form a MIP replicon suitable for detection. In some embodiments, the MIP is simply ligated using a nick repair enzyme, e.g., T4 DNA ligase, AMPLIGASE thermostable DNA ligase, etc., while in some embodiments closing of the probe to form a circle comprises additional modification of the probe to create a ligatable nick, e.g., cleavage of an overlap between the termini, filling of a gap between the termini using a nucleic acid polymerase, etc. A target site or sequence, as used herein, refers to a portion or region of a nucleic acid sequence that is sought to be sorted out from other nucleic acids in the sample that have other sequences, which is informative for determining the presence or absence of a genetic disorder or condition (e.g., the presence or absence of mutations, polymorphisms, deletions, insertions, aneuploidy etc.). A control site or sequence, as used herein, refers to a site that has known or normal copy numbers of a particular control gene. In some embodiments, the targeting MIPs comprise in sequence the following components: first targeting polynucleotide arm-first unique targeting molecular tag-polynucleotide linker-second unique targeting molecular tag-second targeting polynucleotide arm. In some embodiments, a target population of the targeting MIPs are used in the methods of the disclosure. In the target population, the pairs of the first and second targeting polynucleotide arms in each of the targeting MIPs are identical and are substantially complementary to first and second regions in the nucleic acid that, respectively, flank the target site. See, e.g., WO 2017/020023 and WO 2017/020024, each of which is incorporated herein by reference in its entirety. Targeting MIPs replicons may be produced by: i) the first and second targeting polynucleotide arms, respectively, hybridizing to the first and second regions in the nucleic acid that, together, form a continuous target site; and ii) after the hybridization, using a ligation reaction mixture to ligate the nick region between the two targeting polynucleotide arms to form single-stranded circular nucleic acid molecules. In other embodiments, targeting MIPs replicons are produced by: i) the first and second targeting polynucleotide arms, respectively, hybridizing to the first and second regions in the nucleic acid that, respectively, flank the target site; and ii) after the hybridization, using a ligation/extension mixture to extend and ligate the gap region between the two targeting polynucleotide arms to form single-stranded circular nucleic acid molecules.

Circular DNA molecules such as ligated MIPs are suitable substrates for amplification using rolling circle amplification (RCA). In certain embodiments of RCA, a rolling circle replication primer hybridizes to a circular nucleic acid molecule, e.g., a ligated MIP, or circularized cfDNA. Extension of the primer using a strand-displacing DNA polymerase (e.g., $\varphi$29 (Phi29), Bst Large Fragment, and Klenow fragment of E. coli Pol I DNA polymerases) results in long single-stranded DNA molecules containing repeats of a nucleic acid sequence complementary to the MIP circular molecule. There are multiple ways to immobilize the MIP to a surface (e.g., a bead or glass surface) For example, this may be accomplished by priming the rolling circle amplification with a modified oligonucleotide comprising a bindable moiety.

Groups useful for modification of the priming oligonucleotide include but are not limited to thiol, amino, azide, alkyne, and biotin, such that the modified oligonucleotides can be immobilized using appropriate reactions, e.g., as outlined in Meyer et. al. (2014), which is incorporated herein by reference in its entirety, for all purposes. Labels or dyes for use in the context of the present invention are not limited to any particular type. For example, labels may comprise, e.g., a fluorescent dye, quantum dot, or other fluorescent particles. Many different fluorescence labeling systems find application in the embodiments of the technology. In some embodiments, fluorescent dyes (e.g., fluorescein, Texas Red, TAMRA, Cy3, Cy5, may be used, e.g. attached to nucleotide analogs incorporated into oligonucleotides or extension products. In some embodiments, fluorescent particles, e.g., nanoparticles, nanocrystals, quantum dots, silica (e.g., mesoporous silica nanoparticles) polymer beads (e.g., latex), may be used. In embodiments, affinity reagents such as labeled antibodies (whether primary labelled antibodies or secondary labelled antibodies in combination with primary antibodies for a target of interest) may be used to label a structure, as known in the art. Further, detection systems making use of quenchers and dyes or labels configured for fluorescence resonance energy transfer may be used. For example, a pairs of probes configured for fluorescence resonance energy transfer (FRET) may be used, which when hybridized to a strand of DNA produce a signal, for use in detection of e.g. products from RCA. As another example, probes comprising a dye and a quencher may be used, configured to be cleaved, e.g., using a duplex-specific nuclease, such as a restriction enzyme, when hybridized to a strand of DNA, for use in detection of e.g. products from RCA.

Thus, in one particular example, the present disclosure also provides a method for counting circularized nucleic acid probes, comprising: obtaining labelled RCA products at dispersed loci on a support; obtaining microscope image data comprising a plurality of single channel images of an area of the support; and counting the labelled RCA products as objects in the image data using a process described herein. Counting circularized nucleic acid probes may be performed for a diagnostic purpose, such as detecting an aneuploidy (e.g. fetal aneuploidy detected in a maternal blood sample) or detecting cancer in a blood sample of a subject. Detecting an aneuploidy may comprise detecting or counting cell-free DNA (cfDNA) molecules from a maternal blood sample, such as cfD.NA molecules comprising maternal DNA and fetal DNA. Maternal DNA and fetal DNA may be detected by the same probe (e.g. molecular inversion probe) in a single reaction mixture. Detecting cancer may comprises detecting or counting cfDNA molecules from a blood sample from a subject suspected of having cancer.

Obtaining labelled RCA products at dispersed loci on a support may comprise: a) providing a ligation mixture comprising circularized nucleic acid probes and linear nucleic acids; b)treating the ligation mixture with at least one exonuclease, wherein circularized nucleic acid probes are not substrate for the at least one exonuclease; c) forming a plurality of complexes, each complex comprising an oligonucleotide primer hybridized to a circularized nucleic acid probe from the treated ligation mixture; and d) detecting formation of the plurality of complexes in a process comprising: i) extending primers in the complexes in a rolling circle amplification (RCA) reaction to form RCA products that comprise primer portions; and ii) hybridizing labeled probes to the RCA products, wherein RCA products with hybridized labeled probes are localized to a support at dispersed loci, wherein at least a portion of the RCA products localized at the dispersed loci are individually detectable by detection of hybridized labeled probes.

The primers may be localized at the dispersed loci prior to the extending. Alternatively, the primer portions of the RCA products are localized to the dispersed loci after the extending. The primers or primer portions may be bound to one or more surfaces, such as covalently linked to the one or more surfaces. The primers or primer portions may be hybridized to capture oligonucleotides, wherein the capture oligonucleotides are bound to one or more surfaces, preferably covalently linked to the one or more surfaces. The primers may be bound to the one or more surfaces, such as covalently linked to the one or more surfaces, or hybridized to capture oligonucleotides bound to the one or more surfaces, such as covalently linked to the one or more surfaces, before the extending. The support may comprises one or more surfaces selected from a portion of an assay plate, such as a multi-well assay plate, for example a glass-bottom assay plate; a portion of a slide; and one or more particles, such as nanoparticles, wherein the particles may be paramagnetic particles, such as ferromagnetic nanoparticles, for example iron oxide nanoparticles. The primers may be bound to surfaces on particles, such covalently linked to surfaces on the particles, and the RCA products with hybridized labeled probes may be localized to dispersed loci by one or more of a magnet, centrifugation, and filtration. The dispersed loci are typically in an irregular dispersal. The hybridized labeled probes typically comprise oligonucleotides comprising a fluorescent label. The hybridized labeled probes may comprise oligonucleotides comprising a quencher moiety. The plurality of RCA products may be hybridized to labeled probes that all comprise the same label, such as the same fluorescent label. The methods described herein may be particularly advantageous when a plurality of RCA products are hybridized to labeled probes that comprise two, three, four, five, six, seven or more different labels, such as two, three, four, five, six, seven, or more different fluorescent labels.

Forming RCA products may comprises extending the primers in the complexes in a reaction mixture comprising polyethylene glycol (PEG), such as at least 2 to 10% (w:v), at least 12%, at least 14%, at least 16%, or at least 18% to 20% PEG. The PEG may have an average molecular weight between 200 and 8000, between 200 and 1000, between 400 and 800, or about 600. Forming RCA products may comprise incubating a reaction mixture for an incubation period having a beginning and an end, wherein the reaction mixture is treated by mixing one or more times between the beginning of the incubation period and the end of the incubation period. The mixing may comprise one or more of vortexing, bumping, rocking, tilting, and ultrasonic mixing.

Providing the ligation mixture comprising circularized nucleic acid probes and linear nucleic acids may comprise ligating MIP probes, such as padlock probes, in the presence of a target nucleic acid, such as a target nucleic acid from a sample, for example a target DNA from a sample, to form the circularized nucleic acid probes. The at least one exonuclease may comprise at least one exonuclease selected from Rec Jf, Exo VII, Exo T, and Thermolabile Exo I. Treating the ligation mixture with at least one exonuclease may comprise inactivating the at least one exonuclease, such as heat-inactivating the at least one exonuclease, prior to forming the plurality of complexes. Forming RCA products may comprise extending the primers in the complexes in a reaction mixture that comprises the labeled probes. RCA products may be localized at the dispersed loci prior to hybridizing the labeled probes to the RCA products. RCA products with hybridized labeled probes may be treated with graphene oxide prior to counting the RCA products at the dispersed loci. RCA products with hybridized labeled probes may be treated with one or more detergents prior to counting the RCA products at the dispersed loci, such as one or more detergents comprising agents selected from anionic agents, preferably sodium dodecyl sulfate; sodium lauryl sulfate; ammonium lauryl sulfate: cationic agents, such as benzalkonium chloride; cetyltrimethylammonium bromide; linear alkylbenzene sulfonates, such as sodium dodecylbenzene sulfonate; non-ionic agents, preferably a TWEEN detergent selected from polyoxyethylene (20) sorbitan -monolaurate; -monopalmitate; -monostearate; or -monooleate; a TRITON detergent such as selected from a polyethylene glycol p-(1,1,3,3-tetramethylbutyl)-phenyl ether, and steroid and steroidal glycosides, preferably saponin or digitonin; and zwitterionic agents, such as 3-[(3-cholamidopropyl) dimethylammonio]-1-propanesulfonate (CHAPS); and mixtures of detergent agents, such as TEEPOL® detergent, comprising sodium dodecylbenzene sulfonate, and sodium $C_{12}$-$C_{15}$ alcohol ether sulfate. The support may comprise a coating, the coating preferably comprising a polymeric coating polymerized from surface-modifying monomers, wherein the surface-modifying monomers may comprise one or more of dopamine, tannic acid, caffeic acid, pyrogallol, gallic acid, epigallocatechin gallate, and epicatechin gallate monomers, preferably dopamine and tannic acid. The polymeric coating may be homopolymeric. Prior to localizing RCA products at the dispersed loci, the primers, primer portions, or capture oligonucleotides may comprise one or more immobilization moieties, preferably selected from a reactive amine, a reactive thiol group, biotin, and a hapten, wherein the immobilization moieties are exposed to a surface under conditions wherein the immobilization moieties interact with the surface to bind the primers, primer portions, or capture oligonucleotides to the surface. Prior to localizing RCA products at the dispersed loci the surface may comprises at least one of: acrylic groups; thiol-containing groups; reactive amine groups; carboxyl groups; streptavidin, antibodies, haptens, carbohydrates, and lectins.

Obtaining labelled RCA products at dispersed loci on a support may comprise: a)
  providing a ligation mixture comprising circularized nucleic acid probes and linear nucleic acids; b) forming a plurality of complexes, each complex comprising an oligonucleotide primer hybridized to a circularized nucleic acid probe from the ligation mixture, wherein the primer is bound to a nanoparticle, preferably a paramagnetic nanoparticle; c) detecting formation of the plurality of complexes in a process comprising: (i) extending primers in the complexes in a rolling circle amplification (RCA) reaction to form RCA products bound to nanoparticles, wherein at least a portion of the RCA products on nanoparticles are individually detectable; and (ii) localizing RCA products to a support at dispersed loci wherein at least a portion of the RCA products localized at the dispersed loci are individually detectable by detection of hybridized labeled probes; and wherein counting labelled RCA products comprises counting RCA products on the nanoparticles. RCA products with hybridized labeled probes may be localized to dispersed loci by one or more of a magnet, centrifugation, and filtration. The method may further comprise hybridizing labeled probes to the RCA products, wherein at least a portion of the RCA products are individually detectable by detection of hybridized labeled probes. The hybridized labeled probes may comprise oligonucleotides comprising a fluorescent label. The hybridized labeled probes may comprise oligonucleotides comprising a quencher moiety. A plurality of RCA products may be hybridized to labeled probes that all comprise the same label, preferably the same fluorescent label. A plurality of RCA products may be hybridized to labeled probes that comprise two, three, four, five, six, seven or more different labels, preferably two, three, four, five, six, seven, or more different fluorescent labels. The nanoparticles may be paramagnetic nanoparticles, such as iron oxide nanoparticles.

The nanoparticles may have an average diameter of less than about 1000 nm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 5 nm, or 1 nm in diameter. The nanoparticles may be from 1 to 50 nm, such as from 5 to 20 nm average diameter. The nanoparticles may comprise an inorganic core of 2.5 to 55 nm diameter, and an organic coating, the organic coating preferably having an overall thickness of 3 to 5 nm. Prior to binding primers, the nanoparticles may have a surface comprising reactive groups, the reactive groups preferably comprising at least one of: acrylic groups; thiol-containing groups; reactive amine groups; carboxyl groups, wherein the primers comprise reactive groups suitable for forming covalent bonds with reactive groups on the surface of the nanoparticles, and wherein the primers and the nanoparticles are treated together under conditions wherein the primers are covalently bound to the nanoparticles.

The oligonucleotide primer hybridized to the circularized nucleic acid probe may comprise at its 3' end a capture moiety, such as at least one biotin moiety, and further comprises a terminal nucleotide that lacks a 3' OH group. The nucleotide at the 3' end of the primer may be selected from the group consisting of a 2', 3' dideoxy nucleotide and a nucleotide comprising a 3' phosphate, 3' hexanediol, 3' O-methyl, 3' O-acyl, 3' O-allyl, 3' O-ether, 3' O-methoxymethyl, 3' O-nitrobenzyl, 3' O-azidomethylene, and 3'-amino modifier.

EXPERIMENTAL EXAMPLES

Exemplary methods of obtaining and analyzing images will now be described.

Example 1

This example provides experimental protocols for the validation of the spectral unmixing processes described herein.

Molecular Inversion Probe Capture and Circularization

Molecular inversion probes (MIPs) were used to capture artificial linear DNA sequences and were ligated with DNA ligases to create circularized DNA molecules for rolling circle amplification (RCA). For each fluorescent dye used in the RCA assay, a unique MIP sequence was used; the sequences for the different dyes were ligated at the same time.

MIPs were added to the purified synthetic DNA in the following reaction.
  2 µl of Ampligase Buffer (10×), 5 µl of 100 µM MIP, 7.5 µl of 200 µM artificial linear DNA sequence, and 1 µl of AMPligase (80 units). The volume was brought up to 20 µl with nuclease-free water.
  Reactions were incubated at 98° C. for 2 minutes and cooled at 1 degree per minute until reaching 45° C., following which they were maintained for 2 hours at 45° C.

Glass Functionalization for RCA Assay

A glass bottom plate was functionalized to introduce DNA oligonucleotides covalently linked to a polymer attached to the glass surface. Suitable protocols for doing this are known in the art. For example, preparing a surface functionalized support may comprise a) providing a first surface (or substrate; or substrate having a first surface); b) modifying the first surface with one or more surface modifying agent(s) (SMA(s)); c) thereby providing a support comprising a second surface (or coating). The second surface may coat at least a portion of the first surface and may comprise functional groups capable of forming complexes with one or more analytes. The functional groups capable of complexing with the one or more analytes may be an amine group (e.g., a primary, secondary, tertiary or quaternary amine), a carboxylate or carboxylic acid group, or a combination thereof. The modification of the first surface with the one or more SMAs may comprise contacting the first surface with a mixture comprising a carrier, the one or more SMAs, and (optionally) one or more initiators, for example, one or more initiators of polymerization. The SMAs may be a vinyl monomer or a phenol monomer. The vinyl monomer can comprise an acrylate monomer. The acrylate monomer can comprise a carboxylic acid, an amine, or a combination thereof. For example, the acrylate monomer may comprises acrylic acid, methacrylate, ethyl acrylate, propyl acrylate, a butyl acrylate, or a combination thereof. In some examples, the acrylate monomer comprises 2-aminoethyl methacrylate (AEMA), acrylic acid (AA), or a combination thereof. The phenol monomer can comprise two or more phenolic hydroxyl groups. For example, the phenol monomer can comprise a galloyl group, a catechol group, or a combination thereof. The initiator can initiate polymerization, such as the homopolymerization or copolymerization of monomers, for example via a radical polymerization. The initiator can comprise an oxidant, a base, or a combination thereof. The initiator can comprise halogens, azo compounds, organic peroxides, inorganic peroxides, or a combination thereof. In embodiments, the initiator can comprise ammonium persulfate (APS), N,N,N',N'-tetramethylethylenediamine (TEMED), or a combination thereof. The initiator may initiate polymerization thermally, under ambient conditions or a combination thereof. Alternatively, SMAs may comprise photopolymers and polymerization is initiated by light, e.g., from a halogen, argon, xenon or LED light source. Thus, the initiator may be a photoinitiator. Suitable combinations include: a first SMA which is dopamine or tannic acid, a second SMA which is AEMA or acrylic acid, and an initiator selected from ammonium persulfate, TEMED, or a combination thereof. The first surface (or substrate) may be a silanized surface, such as a surface treated with 3-aminopropyltriethoxysilane or 3-(trimethoxysilyl) propyl methacrylate. See, e.g., WO 2019/195346 A1 to Sekedat, et al., Methods, Systems, and Compositions for Counting Nucleic Acids (2019), which is incorporated herein by reference in its entirety, for all purposes.

RCA Assay

RCA was used for linear amplification of fluorescent signal binding sequences obtained from binding the rolling circle products and fluorescently labeled oligonucleotides. The following protocol was used:
Prepare RCA solution on ice
  For a 100 µL RCA solution:
    Pipet entire MIP prep approximately 20 µL or do serial dilutions to obtain less input material (Theoretical input of circularized MIPs is 200 ng/µl).
    Pipet 10 µL of 10× Phi 29 Buffer for a 1× final concentration.
    Pipet 4 µL of 10 mM dNTPs for a 0.4 mM in final solution.
  Prepare a 30% Polyethylene glycol (PEG) solution from PEG molecular weight 600 in molecular grade water and filter with a 0.2 µm pore size filter.
  Pipet 50 µL of filtered 30% PEG.
  Pipet 4 µL of Phi 29 for 80 units in final solution (keep Phi 29 on ice when not in use).
  Pipet 12 µL of molecular grade water.
Vortex solution and pipet onto treated glass surface, then seal plate.
Place plate on flat bottom heat block of thermomixer at 45° C. for 90 minutes.
Remove well contents and wash thrice with 100 µL of 1X TBS.
Add fluorescent oligos to stain the rolling circle product, by adding 5 µL 10× PHI 29 buffer, 0.01% Teepol detergent, and 2.5 µM fluorescently labeled oligo.
Incubate fluorescent dye at 37° C. for 30 minutes.
Remove well contents and wash four times with 100 µL of 1× TBS.
Keep last wash on and image in microscope.

Imaging

An epifluorescence microscope (IXM4, Molecular Devices) was used for imaging fluorescent RCA products. Automated microscopy may advantageously be used for high-throughput assays. A 20× objective was used for capturing images. Plates were placed in the IXM4 microscope and were imaged as follows:
  Plates were auto-exposed to ensure a broad dynamic range (maximum range of the camera used such as 16-bit images) in the fluorescence intensity values.
  For imaging, each well of the plate was sub-divided into a 10×10 grid of 100 images total. Of these, 45 images covering the central portion of the well were analyzed. Each image had 2048×2048 pixels, covering area of 0.6×0.6 mm$^2$. The capture area of individual pixels was approximately 0.3×0.3 µm$^2$.
  For each image (well locus) acquisition was performed in all dye channels as specified by the experimental setup.

Dyes

Alexa dyes were used in this experiment as stain fluorophores: Alexa 488, Alexa 546, Alexa 594, Alexa 647, Alexa 700, Alexa 750. Emission spectra of these dyes were obtained from the vendor (Integrated DNA Technologies).

Example 2

This example describes a process for generation of simulated images that can be used to assess the performance of image processing approaches.

Because ground truth information (i.e. conclusive information that allows to identify which regions of an image should be identified as part of a respective object in a respective channel) often is not available, in silico images can be obtained to assess the performance of an image processing method. As the objects in such in silico generated images are intentionally placed by the user, the images are by design associated with a ground truth that can be used in the assessment of the performance of a method to recover said objects.

Real (i.e. experimental) negative control images were used as a backdrop. For each such image and channel, the thresholds were first determined, as described in Example 3. Next, "objects" (each object comprising one pixel) were created by setting the pixel intensity to a specified (suprathreshold) value at select pixels. To model spectral crosstalk, intensities of "crossing" objects were scaled by the corresponding value from a spectral unmixing matrix (see Example 3) constructed based on the emission spectra of the dyes simulated (in the present case, Alexa 488, Alexa 546, Alexa 594, Alexa 647, Alexa 700, Alexa 750—See FIG. 5), obtained from the vendor (Integrated DNA Technologies).

The assigned locations of crossing objects were subjected to a slight jitter (randomly shifting the object coordinates by one pixel), to model channel-specific fluctuations. Finally, the resulting images were convolved with a symmetric Gaussian filter to mimic the blurring effect of imaging.

Example 3

This example describes image processing steps that were applied to the imaging data described in Examples 1 and 2.

Regardless of the spectral unmixing algorithm used, all acquired images were first processed by thresholding followed by segmentation, as described below. Various unmixing steps were then applied alone or in combinations, as described below.

Thresholding

For each imaged locus, threshold maps were obtained as follows. First, for each channel a threshold was inferred using negative control image(s), using adaptive thresholding with a square footprint (11×11 pixels around the pixel of interest). The channel-specific threshold was estimated as the 99.999% percentile of the distribution of pixel intensity offsets relative to the pixel neighborhood (as defined by the size of the square footprint). Next, these channel-specific thresholds were applied to the locus channel images, again using adaptive thresholding with the same square footprint as in the threshold estimation step. A pixel was labeled as foreground if the difference between its intensity and the median intensity of its neighborhood (as defined by the square footprint) exceeded the corresponding channel threshold.

Segmentation

After thresholding, each image was segmented. Segmentation refers to the process of identifying groups of foreground pixels that form individual objects. Many segmentation algorithms are known in the art. Segmentation algorithms that output information sufficient to identify the location of objects each associated with unique labels are advantageous. This may be in the form of e.g. a matrix where each element of the matrix maps to a pixel of the image, where different segmented objects are assigned unique labels recorded in the matrix.

In the present example, image segmentation was performed using the watershed algorithm. The watershed algorithm represents the image intensity map as an (inverted) topographic map, with pixel intensity corresponding to the basin depth (higher-intensity pixels are closer to the "bottom"). Image segmentation is then performed by "filling the basins" and registering the pixels that belong to the same "basin". As a result, a map is obtained where pixels that are considered to belong to the same object are indexed by the same number.

Construction of the Spectral Unmixing Matrix

Figure 5:
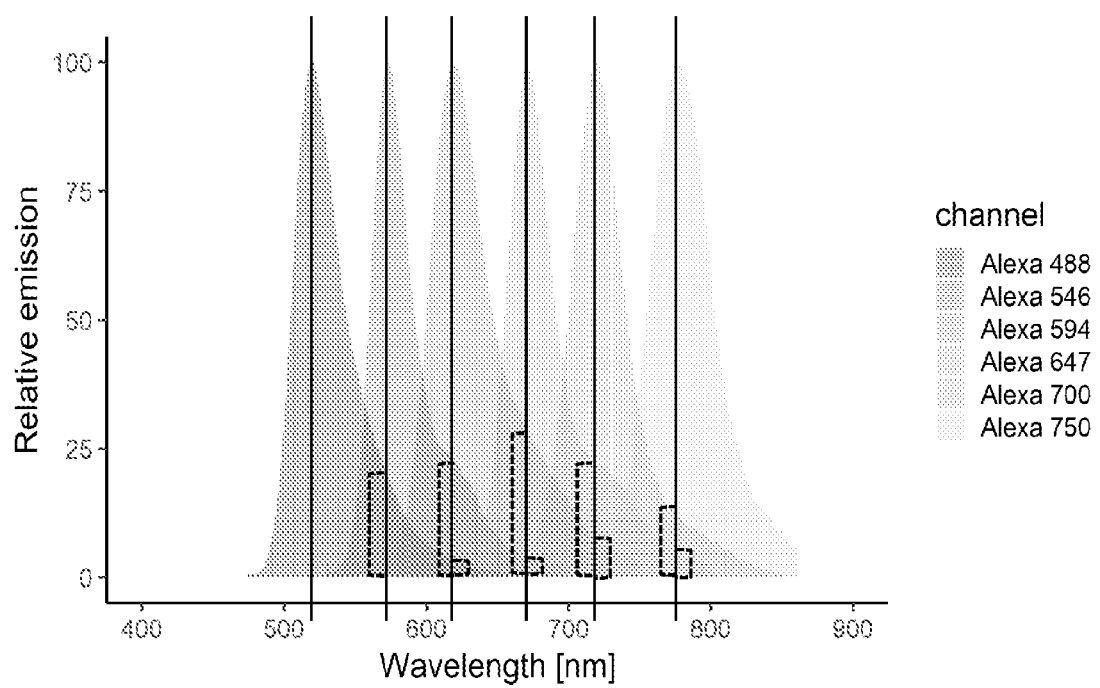
FIG. 5 shows relative emission spectra (also referred to herein as "normalized emissions spectra") for dyes Alexa 488, Alexa 546, Alexa 594, Alexa 647, Alexa 700, and Alexa 750. The vertical lines indicate, from left to right, the peak emission wavelength for Alexa 488, Alexa 546, Alexa 594, Alexa 647, Alexa 700, and Alexa 750, respectively. The dashed brackets indicate, from left to right: (i) around the peak emission for Alexa 546: the emission of Alexa 488 crossing into the Alexa 546 channel, (ii) around the peak emission for Alexa 594: the emission of Alexa 546 crossing into the Alexa 594 channel, the emission of Alexa 488 crossing into the Alexa 594 channel, (iii) around the peak emission for Alexa 647: the emission of Alexa 594 crossing into the Alexa 647 channel, the emission of Alexa 546 crossing into the Alexa 647 channel, (iv) around the peak emission for Alexa 700: the emission of Alexa 647 crossing into the Alexa 700 channel, the emission of Alexa 594 crossing into the Alexa 700 channel, and (v) around the peak emission for Alexa 750: the emission of Alexa 700 crossing into the Alexa 750 channel, and the emission of Alexa 647 channel crossing into the Alexa 700 channel.

A spectral unmixing matrix can be constructed using any information about the imaging system and/or the sources of signal (e.g., dyes) that influence the spectral mixing process. In a simple example, a spectral unmixing matrix can be constructed using the emission spectra of the dyes used. The emission spectra may be theoretical/reference spectra, or effective spectra that also capture features of a particular imaging system. In the present case, a spectral unmixing matrix was constructed as follows:

Step 1: for each dye, normalize the emission spectrum: in this case the normalized emission spectrum for each dye was obtained by dividing the emission at each wavelength by the peak emission (i.e. maximum emission) for the dye, resulting in a spectrum with emissions ranging between 0 and 1 or 0 and 100 (i.e. expressing the normalized emission spectra in % of the respective peak emission), as illustrated on FIG. 5 for dyes Alexa 488, Alexa 546, Alexa 594, Alexa 647, Alexa 700, and Alexa 750. These spectra may be referred to as relative emission spectra Step 2: for each (normalized) spectrum, determine the wavelength for which peak emission (e.g. 100, if the relative emission spectrum is expressed in % of the peak emission) is obtained. These are indicated by the vertical lines on FIG. 5. As can be seen on FIG. 5, in many cases this cannot simply rely on the numbers that appear in the dye names; i.e., for Alexa 488 the emission peak is not really at 488 nm.

Step 3: build the unmixing matrix as matrix A with coefficients $a_{ij}$ where entry $a_{ij}$ is the (normalized) emission of the spectrum of dye j (from Step 1—typically expressed as a value between 0 and 1 rather than as a % value) at the peak emission wavelength of dye i (from Step 2). In other words: given the wavelength at which the "true" dye exhibits peak emission, pull the emissions of other dyes at this wavelength, and fill the matrix row. These are indicated by dashed brackets on FIG. 5. The resulting unmixing matrix has "1" in the diagonal ("true" dyes), "0" when the emission spectra of two dyes don't overlap at all, and non-zero values (in the 0-1 range) otherwise. For example, by reference to FIG. 5, the row for the peak emission of Alexa 488 will have a "1" in the "Alexa 488" column, and "0" in all other columns. The row for the peak emission of Alexa 546 will have a "1" in the "Alexa 546" column, a non-zero coefficient corresponding to the square bracket indicated on FIG. 5 (left of the vertical line indicating the peak emission of Alexa 546) in the "Alexa 488" column, and "0" in all other columns. The row for the peak emission of Alexa 594 will have a "1" in the "Alexa 594" column, a non-zero coefficient corresponding to the left square bracket indicated on FIG. 5 (left of the vertical line indicating the peak emission of Alexa 594) in the "Alexa 594" column, a non-zero coefficient corresponding to the right square bracket indicated on FIG. 5 (right of the vertical line indicating the peak emission of Alexa 594) in the "Alexa 488" column, and "0" in all other columns. The other rows can be obtained following the same principles.

Basic (Pixel) Unmixing

In many applications, including e.g. molecular counting applications, each high-resolution image typically contains approximately $4 \times 10^6$ pixels. Thus, unmixing all pixels in an image is computationally very intensive and becomes unrealistic when an experimental system generates thousands of images in one session. To overcome this computational bottleneck, unmixing is applied only to those pixels that need to be unmixed, which are determined as pixels that are shared by images in at least 2 channels.

As a result of the thresholding step above, each channel c in each image is associated with a binary image matrix $T^c$ (referred to herein as a channel specific foreground matrix) with elements $T_{ij}^c$ where ij are the coordinates of a single pixel, and the corresponding element in matrix $T^c$ is set to "1" if the pixel was identified as a foreground pixel (in the respective channel), and "0" otherwise. As the skilled person understands, references to a (two dimensional) matrix and coordinates ij are used for ease of understanding as individual single color images can easily be seen as two dimensional arrays of pixels each associated with x,y coordinates and an intensity value. However, each such matrix can instead be represented as a vector (e.g. by concatenation) or as part of a multi-dimensional array (e.g. where each channel is represented as a two dimensional matrix along a third dimension), or any other representation that maintains the identity of individual pixels.

The channel specific foreground matrices were used to compute the shared foreground matrix T as:

$$T_{ij} = \begin{cases} 1 & \sum_c T_{ij}^c > 1 \\ 0 & \text{otherwise} \end{cases} \quad (1)$$

The shared foreground matrix T contains "1" at those pixels that appear as foreground in at least 2 channels, while it contains "0" at all other pixels.

For each shared foreground pixel ij (i.e. each pixel for which the corresponding element in T contains a "1"), a vector of observed channel intensities can be built, such that $$p_{ij} = (p_{ij}^{c=1}, \ldots p_{ij}^{c=N_c}) = (M_{ij}^{c=1}, \ldots M_{ij}^{c=N_c}) \quad (2)$$

where $p_{ij}^{c=n}$ is the intensity of pixel ij in channel n, which can also be denoted as $M_{ij}^{c=n}$, the intensity of pixel ij in the raw image matrix for channel n. Each pixel vector can then be normalized, for example by computing:

$$p_{ij} = \frac{p_{ij}}{\sum_c p_{ij}^c} \quad (3)$$

The task of pixel unmixing is then to infer, for each such pixel vector, the corresponding vector of expected abundances. The expected abundances represent the "true" channel intensities in the pixel, i.e. the quantity of signal that is truly associated with each channel. In the particular case where every pixel is expected to be associated with a single dye, the abundances capture the likelihood that the pixel is associated with each of the dyes (each dye corresponding to a particular channel).

Linear pixel unmixing assumes that each mixed pixel is a linear combination of the spectra of the elements that produced the signal, weighted by the relative abundance of the elements in the area captured by the pixel. Linear pixel unmixing can be achieved by solving the following constrained linear optimization problem:

$$p_{ij} = U\widehat{p_{ij}^c} \quad (4)$$

$$\sum_c \widehat{p_{ij}^c} = 1 \quad (5)$$

$$\widehat{p_{ij}^c} \geq 0 \ (c=1,2,3,\ldots N_c) \quad (6)$$

where U is the spectral unmixing matrix (also referred to as "spectral overlap matrix"), and $\widehat{p_{ij}}$ is a vector of expected abundances corresponding to pij (the normalized raw pixel intensity vector), with elements $\widehat{p_{ij}^c}$ corresponding to respective channels c. The vector $\widehat{p_{ij}}$ represents the expected abundances of the imaging channels at pixel ij. For example, when looking at fluorescence images, the spectral unmixing matrix U may represent the (theoretical or effective) emission spectra of the various dyes that are being imaged, at the wavelength imaged in each channel. An effective emission spectrum may capture effects that are related to the emission of a particular dye as well as effects that are related to the imaging system that is being used (e.g., including a particular detector which may include a particular filter that influences the "effective" registered emission for a particular dye). In the simplest example, the spectral unmixing matrix U represents the known emission spectra of the various dyes that are being imaged, at the wavelength imaged in each channel. The matrix U is set as a parameter of the method, and is either known or assumed. Many fluorescent dyes have well characterized emission spectra.

Identifying the vector $\widehat{p_{ij}}$ for each unmixed pixel completes the pixel unmixing step. The vector $\widehat{p_{ij}}$ comprises the "true" abundances of the respective signals from the various dyes, at pixel ij.

The pixel unmixing step results in unmixed intensity values for each pixel, but do not assign a single channel to each pixel, or a single identity to the objects that the pixels belong to. This is performed using one or more unmixing approaches as described below.

Pixel-Based Unmixing

For each unmixed pixel vector $\widehat{p_{ij}}$, the true channel is decided as a channel for which the expected abundance is maximal:

$$\widehat{c_{ij}} = \operatorname{argmax}_c(\widehat{p_{ij}}) \quad (7)$$

where $\widehat{c_{ij}}$ is a single value corresponding to the channel that is associated with the highest expected abundance for pixel ij. At this stage, all pixels in the image have been assigned a unique channel label, and the image is considered unmixed. Segmentation can be performed again on the pixel unmixed images, resulting in a new set of objects comprising pixels that are a subsets of the original objects.

Object-Based Unmixing (Hard Threshold)

For each unmixed pixel vector $\widehat{p_{ij}}$, the true channel is first decided as a channel for which the expected abundance is maximal, as per equation (7).

For each channel c and each object $o_n^c$, the candidate channel is then determined as the channel with the highest presence in the object $$\widehat{c'} = \operatorname{argmax} \ (\Sigma_{ij} \delta(c', \widehat{c_{ij}}) | c'=1,2, \ldots N_c; ij \in o_n^c) \quad (8)$$

where $\widehat{c'}$ is a single value corresponding to the channel that is most represented amongst the $\widehat{c_{ij}}$ values for the pixels ij that are part of the object $o_n^c$ (where objects are defined by segmentation in a channel-wise manner such that a set of pixels ij belonging to an object in channel c=n may overlap with a set of pixels ij belonging to an object in channel c=m). As a result of this step, each object $o_n^c$ is associated with a candidate channel $\widehat{c'}$.

For each object $o_n^c$, a decision is then made as to whether the object truly belongs in the channel where it was identified (true object), or whether the object is crossing from another channel. In particular, the object $o_n^c$ is delted from $T^c$, the threshold matric of channel c, if both conditions (9) and (10) hold:

$$\hat{c'} \neq c \tag{9}$$

$$U_{c,\hat{c'}} \neq 0 \tag{10}$$

where equation (9) represents the condition that the candidate channel identified in the preceding step is not the same as the channel in which object $o_n^c$ was identified, and equation (10) represents the condition that spectral crosstalk between the candidate channel and the channel in which object $o_n^c$ was identified is supported by the spectral unmixing matrix. In other words, these conditions capture the assumption that: (a) an object is likely to be a crossing object if the individually unmixed pixels that make up the object indicate that another channel is more likely, and (b) crossing of the signal of the "other channel" in the current channel is possible (and expected) according to the known spectra of the dyes associated with the respective channels.

Object-Based Unmixing (Soft Threshold)

For each channel c and each object $o_n^c$, we first determine the center of mass (COM) of pixel abundances:

$$\widehat{p_n^c} = \langle \widehat{p_{ij}} \rangle; \ i,j \in o_n^c \tag{11}$$

Next, the candidate channel is decided as a channel for which the expected COM abundance is maximal:

$$\hat{c'} = \text{argmac}_c(\widehat{p_n^c}) \tag{12}$$

At this point, it is possible to accept the candidate channel and proceed to the object unmixing decision step as described above, by deleting the object $o_n^c$ from $T^c$, the threshold matrix of channel c, if both conditions (9) and (10) hold.

Optionally, an odds ratio may be computed and evaluated as a further condition to conditions (9) and (10). Computing the odds ratio can be helpful for example in tie-like situations, where the current and candidate channels have nearly the same abundance. Denoting the expected COM abundance of the current channel by $\widehat{p_n^c}$, the odds ratio of the candidate channel with respect to the current channel can be defined as $$OR = \frac{\widehat{p_n^{\hat{c'}}}(1 - \widehat{o_n^c})}{\widehat{o_n^c}(1 - \widehat{p_n^{\hat{c'}}})} \tag{13}$$

where $\widehat{p_n^{\hat{c'}}}$ is the expected COM abundance of the candidate channel. A decision threshold can then be applied to the odds ratio to decide if the object is crossing from another channel (and should be removed from the current channel). For example, object $o_n^c$ may be deleted from $T^c$, the threshold matrix of channel c, if conditions (9) and (10) hold, and:

$$OR > \theta_{OR} \tag{14}$$

where $\theta_{OR}$ is a chosen odds ratio threshold.

Example 4

This example describes the application of the image processing methods described in Example 3 to the data describes in Examples 1 and 2.

Performance of the different spectral unmixing approaches was quantified as described below. Note that different quantification metrics were used for in-silico and experimental validation, in part because ground truth for experimental validation was not known.

Quantification of In-Silico Mixing Unmixing Performance

The recall metric (object call sensitivity) was defined as a fraction of the number of correctly called objects (in the sense of their channel identity) to the number of objects that were detected for the non-mixed system. The precision metric (positive predictive value) was defined as a fraction of the number of correctly called objects (in the sense of their channel identity) to the number of objects that were detected for the non-unmixed system.

Note that the detection in all cases was performed using the same image-processing algorithm for the thresholding and segmentation steps. The results of these analyses are shown on FIGS. 6, 7, 8, 9 and 10.

Figure 6:
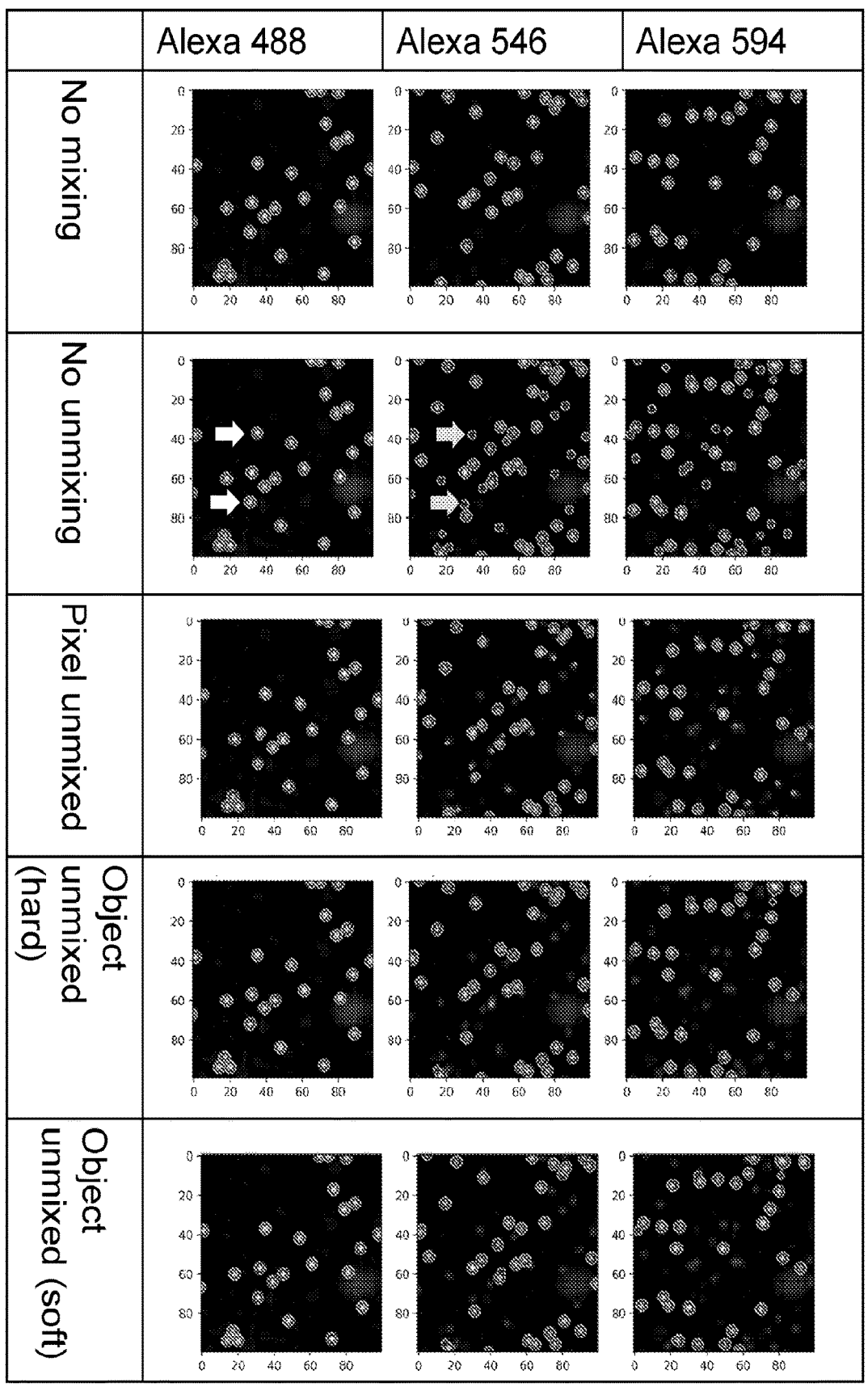
FIG. 6 shows the results of a simulation experiment where different unmixing processes were applied to in silico simulated fluorescence microscope images. A multiplex of 6 dyes was simulated, at different levels of imposed objects per image. Spectral mixing of images was performed as described in main text. Rows correspond to different unmixing processes (top to bottom: non-mixed, mixed-no unmixing, mixed-pixel-unmixed, mixed-object-unmixed with hard object unmixing, mixed-object-unmixed with soft object unmixing). Columns correspond to different channels (left to right: Alexa 488, Alexa 546, Alexa 596, Alexa 645, Alexa 700, Alexa 750). Objects (true and crossing) appear as grayscale blobs. Red contours mark objects that were detected by image segmentation. Thresholds for image segmentation were derived based on a negative control image, which also served as a backdrop for depositing simulated objects.
Figure 6:
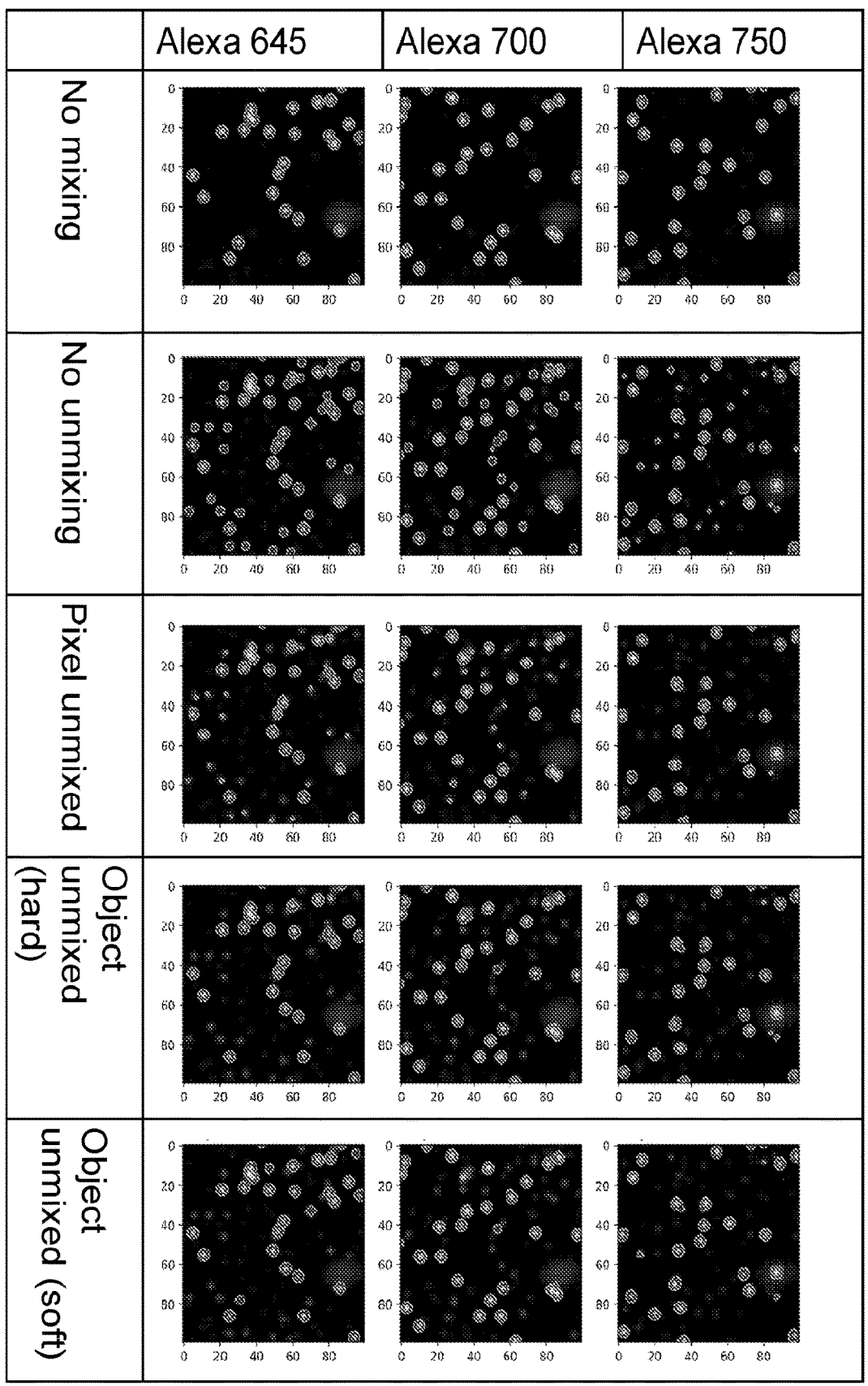

FIG. 6 shows the results of a simulation experiment where different unmixing processes were applied to in silico simulated fluorescence microscope images. A multiplex of 6 dyes (Alexa 488, Alexa 546, Alexa 596, Alexa 645, Alexa 700, Alexa 750) was simulated, at different levels of imposed objects per image, with spectral mixing as explained in Example 2. The top row of FIG. 6 shows the simulated data prior to mixing (i.e. simulated data with no spectral crosstalk). This row represents the "ground truth" data: it shows the location of true objects in each channel. The second row of FIG. 6 shows the simulated data after mixing (i.e. simulated data with spectral crosstalk applied based on the spectral unmixing matrix as described in Example 2). Comparing the top row and the second row shows the objects that are crossing objects in each channel (objects that are present in the second row but absent in the top row). The Alexa 488 channel (left-most column) does not include any crossing objects because none of the other dyes emit in that channel. However, the Alexa 546 channel (second column from the left) does including crossing objects from the Alexa 488 channel (some of which are indicated with grey arrows in the Alexa 546 image, with the corresponding true objects in the Alexa 488 channel indicated with white arrows on the Alexa 488 image). Similarly, crossing objects can be seen in the second row for the Alexa 596, Alexa 645, Alexa 700, and Alexa 750 channels. The third to fifth rows correspond to different object unmixing approaches.

In all three approaches, the steps described as Basic (pixel) unmixing in Example 3 were applied. These were followed by three different processes for unmixing of pixels/objects. The row labelled "pixel unmixed" shows images that have been processed using the Pixel-based unmixing method described in Example 3. This approach assigns a single channel to each pixel in each channel but does not make an object-wise decision. The row labelled "Object unmixed (hard)" shows images that have been processed using the Object-based unmixing (hard threshold) method described in Example 3. The row labelled "Object unmixed (soft)" shows images that have been processed using the Object-based unmixing (soft threshold) method described in Example 3, with an OR threshold of 1. As can be seen in the Alexa 546 channel, both object unmixing approaches successfully removed the crossing objects indicated with the grey arrows, while maintaining the majority of the true objects in the channel (compare the images in the two bottom rows with the image in the top row). By contrast, using pixel unmixing only still resulted in many crossing objects being present in the image. Comparing the two bottom rows for the Alexa 546 channel further shows that the soft object unmixing approach avoided the unnecessary removal of a true object (grey area that is no longer outlined as an object in the penultimate row but is still—correctly—included as an object in the bottom row). Similar observations can be made in all other channels.

Figure 7:
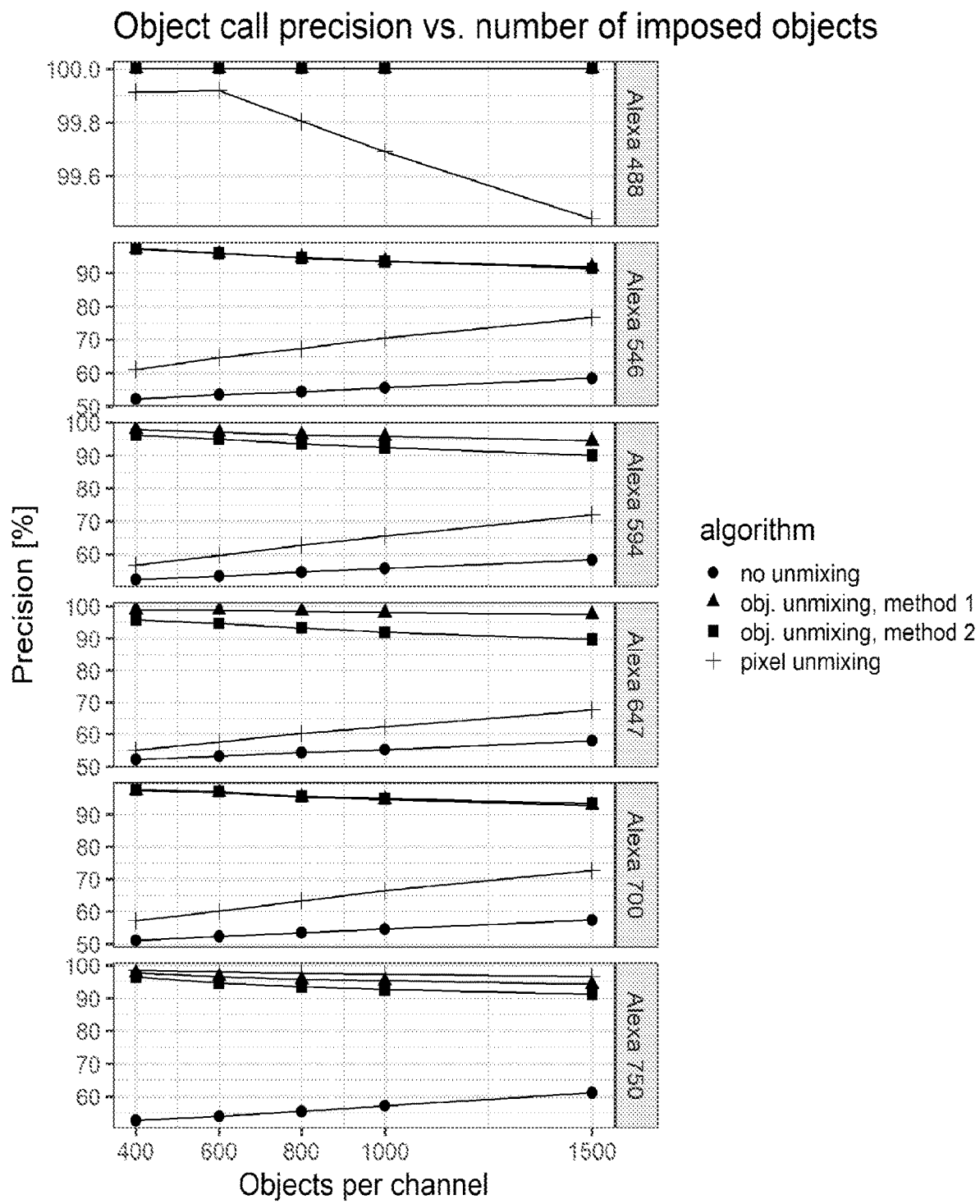
FIG. 7 shows the results of a simulation experiment where different unmixing processes were applied to in silico simulated fluorescence microscope images, in terms of precision of the object calling process for various numbers of objects in the simulated images. The precision refers to the positive predictive value (PPV), i.e. the ratio (in %) of the number of objects called that were true objects (true positive calls) relative to the total number of objects called (both true and crossing; true and false positive calls). In silico mixed images were generated as described in the main text. Each data series corresponds to a different unmixing process (mixed-no unmixing, mixed-pixel-unmixed, mixed-object-unmixed 1 (hard object unmixing), mixed-object-unmixed 2 (soft object unmixing)).
Figure 8:
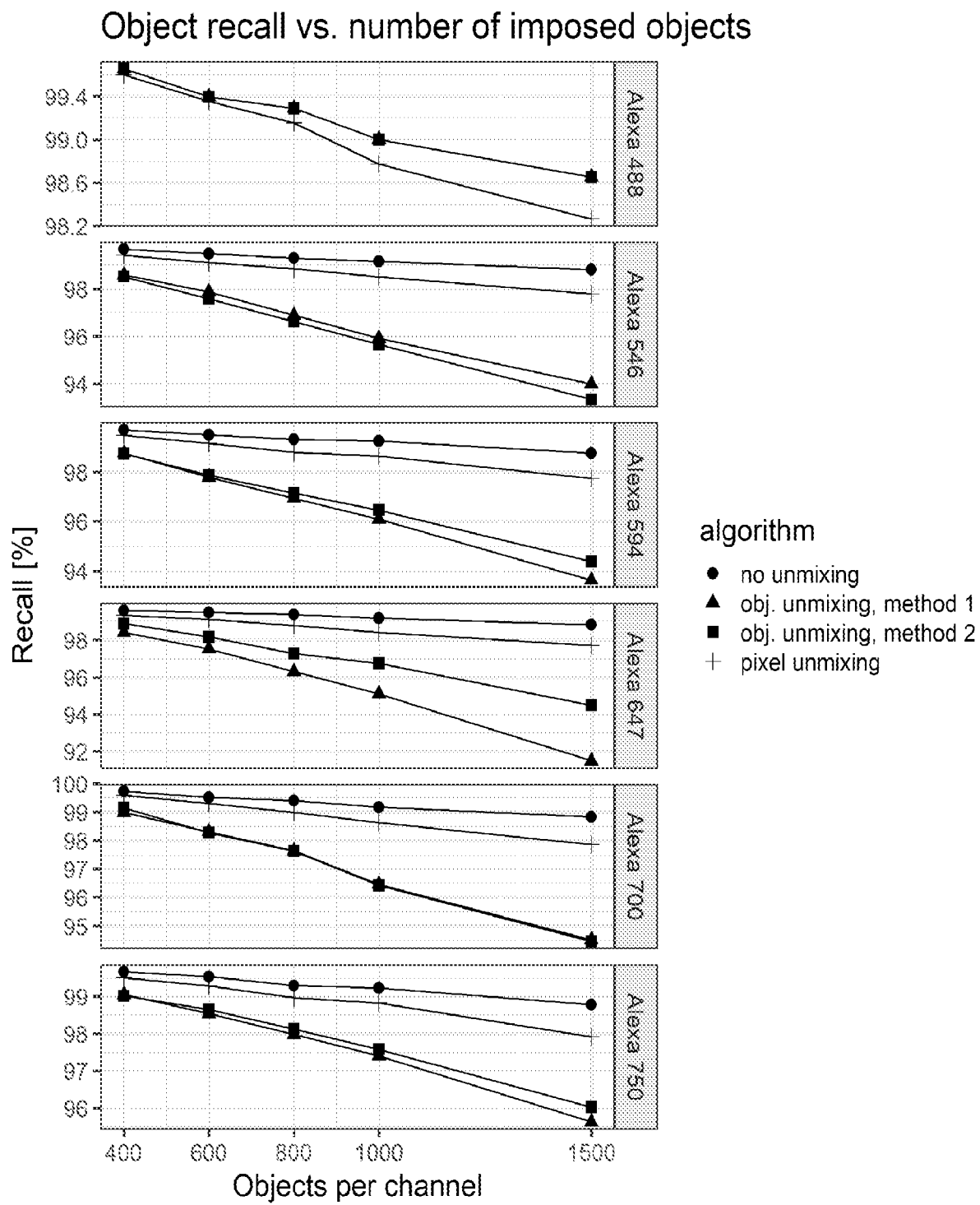
FIG. 8 shows the results of a simulation experiment where different unmixing processes were applied to in silico simulated fluorescence microscope images, in terms of recall of the object calling process for various numbers of objects in the simulated images. The recall refers to the sensitivity, i.e. the ratio (in %) of the number of objects called that were true objects (true positive calls) relative to the total number of true objects (true positive calls and false negative calls). In silico mixed images were generated as described in the main text. Each data series corresponds to a different unmixing process (mixed-no unmixing, mixed-pixel-unmixed, mixed-object-unmixed 1 (hard object unmixing), mixed-object-unmixed 2 (soft object unmixing)).

FIGS. 7 and 8 show the results of a simulation experiment where different unmixing processes were applied to in silico simulated fluorescence microscope images, in terms of precision of the object calling process (calculated as explained above) in FIG. 7, and in terms of recall of the object calling process in FIG. 8. In silico mixed images were generated as described above, with different numbers of objects per channel. Each data series corresponds to a different unmixing process: no unmixing, pixel unmixing only (as described under Pixel-based unmixing in Example 3), object unmixing with hard threshold (labelled as "obj. unmixing, method 1", as described under Object-based unmixing (hard threshold) in Example 3), and object unmixing with soft threshold (labelled as "obj. unmixing, method 2", as described under Object-based unmixing (soft threshold) in Example 3). The precision refers to the positive predictive value (PPV), i.e. the ratio (in %) of the number of objects called that were true objects (true positive calls) relative to the total number of objects called (both true and crossing; true and false positive calls). The recall refers to the sensitivity, i.e. the ratio (in %) of the number of objects called that were true objects (true positive calls) relative to the total number of true objects (true positive calls and false negative calls).

The data on FIG. 7 shows that in the absence of unmixing, many objects in the channels that have crossing objects (i.e. all channels apart from Alexa 488) are wrongly identified (PPV around or below 60%, indicating that approximately 40% of the objects identified are not true objects). Using pixel unmixing slightly improves this situation, but the PPV remains below 80% for all but the Alexa 750 channel. By contrast, either of the object unmixing approaches results in PPV values above 90% for all channels. The data on FIG. 8 shows that, as expected, increases in PPV are accompanied by slight decreases in recall. Indeed, there is typically a trade-off between the stringency of an approach in calling positive objects (the more stringent the approach, the higher the expected PPV) and the likelihood that the approach will miss some true positive objects (the more stringent the approach, the lower the expected recall). However, FIG. 8 shows that any drops in recall associated the object unmixing approaches are relatively small (notice the different scales in FIG. 8 compared to FIG. 7). Indeed, both object unmixing approaches maintain recall values above 90% for all channels and all object densities.

Figure 9:
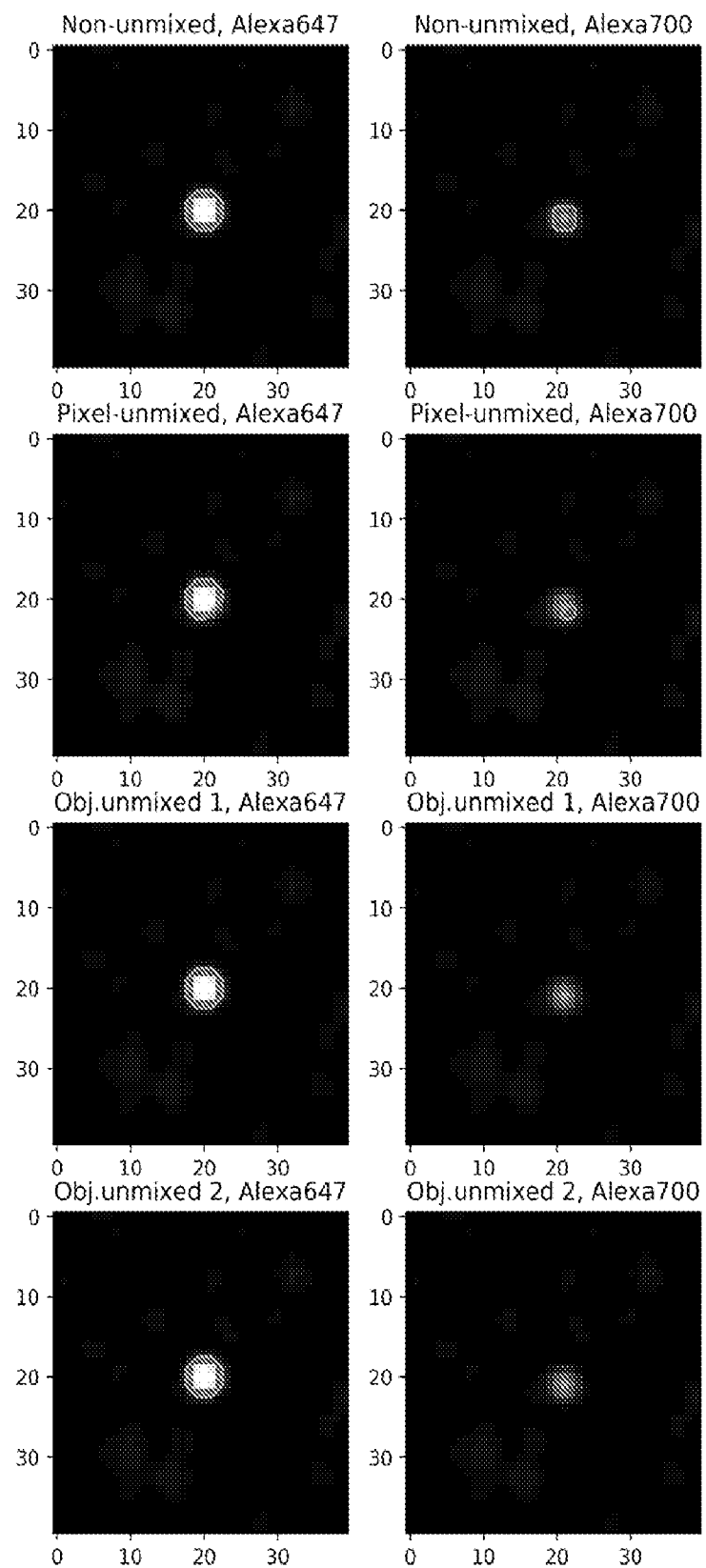
FIG. 9 shows an example of an object (in an in silico simulated image) that is correctly identified using object unmixing but not using pixel unmixing. An object was imposed on channel Alexa 647, and its corresponding "crossing" object was imposed on channel Alexa 700, with a spatial jitter of 1 pixel. Object unmixing (soft and hard object unmixing) correctly identified the object in Alexa 700 as crossing from Alexa 647. On the other hand, pixel unmixing, while able to unmix the object's pixels, failed to remove the crossing object in its entirety from the "host" channel (Alexa 700).
Figure 10:
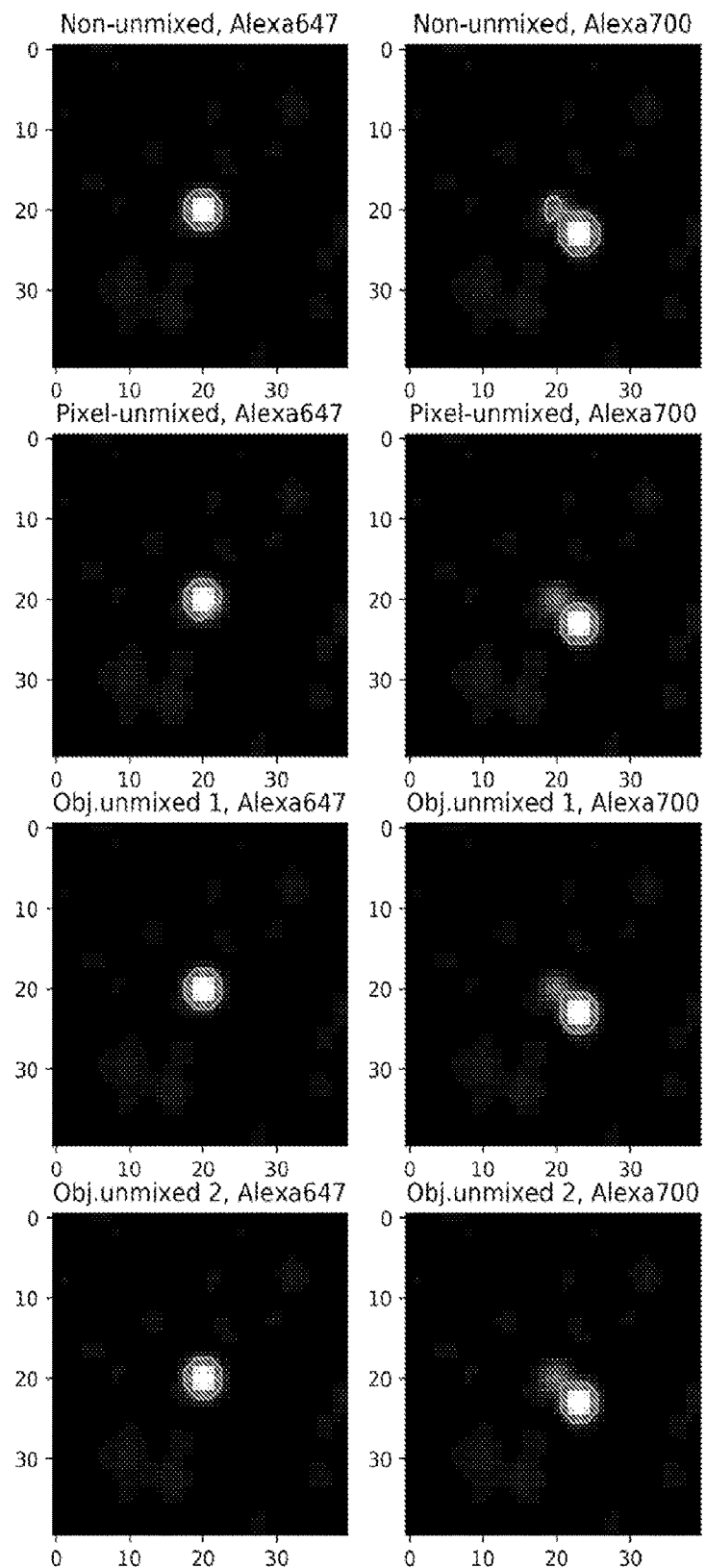
FIG. 10 shows an example of unmixing of two spatially adjacent objects (in an in silico simulated image). Objects were imposed on channels Alexa 647 and Alexa 700, and a "crossing" object from Alexa 647 was added to the image for Alexa 700, with a spatial jitter of 1 pixel. All spectral unmixing processes (pixel unmixing, object unmixing versions 1 (hard object unmixing) and 2 (soft object unmixing)) correctly identified the "true" object in Alexa 700 and eliminated the "crossing" object from Alexa 647.

FIGS. 9 and 10 show close up views of exemplary objects from simulated data. Objects were imposed on channels Alexa 647 and Alexa 700, and a "crossing" object from Alexa 647 was added to the image for Alexa 700, with a spatial jitter of 1 pixel—as described in Example 2. FIG. 10 shows an example with two spatially adjacent objects that are correctly identified using all unmixing approaches (all spectral unmixing processes correctly identified the "true" object in Alexa 700 and eliminated the "crossing" object from Alexa 647). By contrast, FIG. 9 shows an example of an object that is correctly identified using object umixing but not using pixel unmixing. FIG. 9 shows that object unmixing (soft and hard object unmixing) correctly identified the object in Alexa 700 as crossing from Alexa 647 (and hence removed the object from channel Alexa 700, as indicated by the removal of the object outline). On the other hand, pixel unmixing, while able to unmix the object's pixels, failed to remove the crossing object in its entirety from the "host" channel (Alexa 700—as indicated by the object outline still being present).

Quantification of Experimental Unmixing Performance

The false positive rate (FPR) was defined as a fraction of the number of crossing objects (objects detected in a well that had MIPs labeled by fluorophores that spectrally overlapped with the imaged channel) to the number of objects detected in a well that had MIPs labeled by fluorophores that corresponded to the imaged channel. Based on this, object call specificity was defined as 1—FPR.

Object call sensitivity was impossible to quantify in these experiments because the actual number of RCA products on the well surface was not known. Thus, relative change in object call sensitivity owing to the specific unmixing algorithm was quantified instead. The baseline case (against which sensitivity change was evaluated) corresponded to the non-unmixed case.

Figure 11:
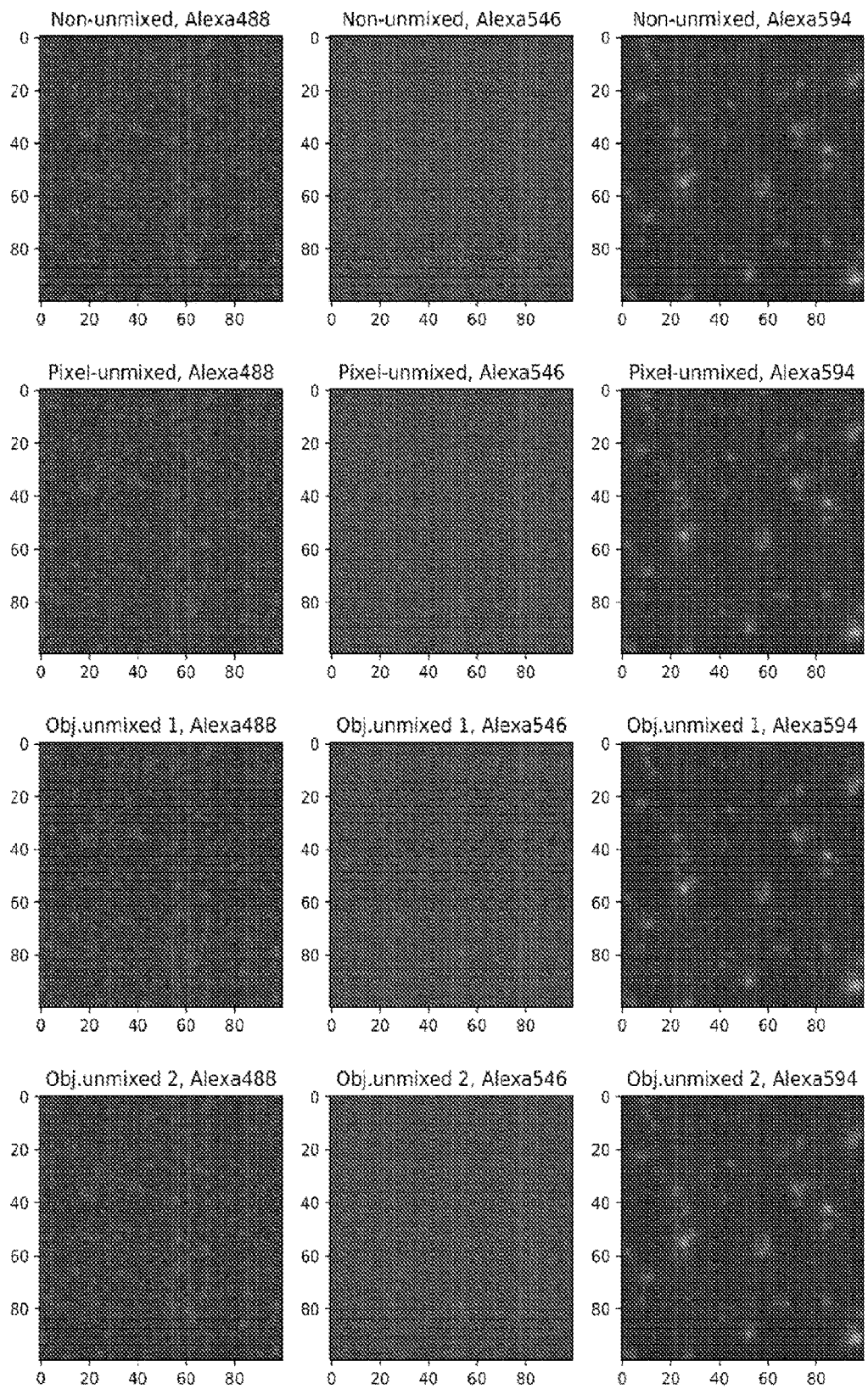
FIG. 11 shows the results of experimental validation of the spectral unmixing processes described herein using a singular staining approach. The images shown were captured for the same locus, using different dye filters (from left to right: Alexa 488, Alexa 546, Alexa 596, Alexa 647, Alexa 700, Alexa 750). Rows correspond to different scenarios (top to bottom: non-unmixed, pixel-unmixed, object-unmixed 1 (hard object unmixing), object-unmixed 2 (soft object unmixing)). Objects appear as grayscale blobs. Red contours show the results of image segmentation.
Figure 11:
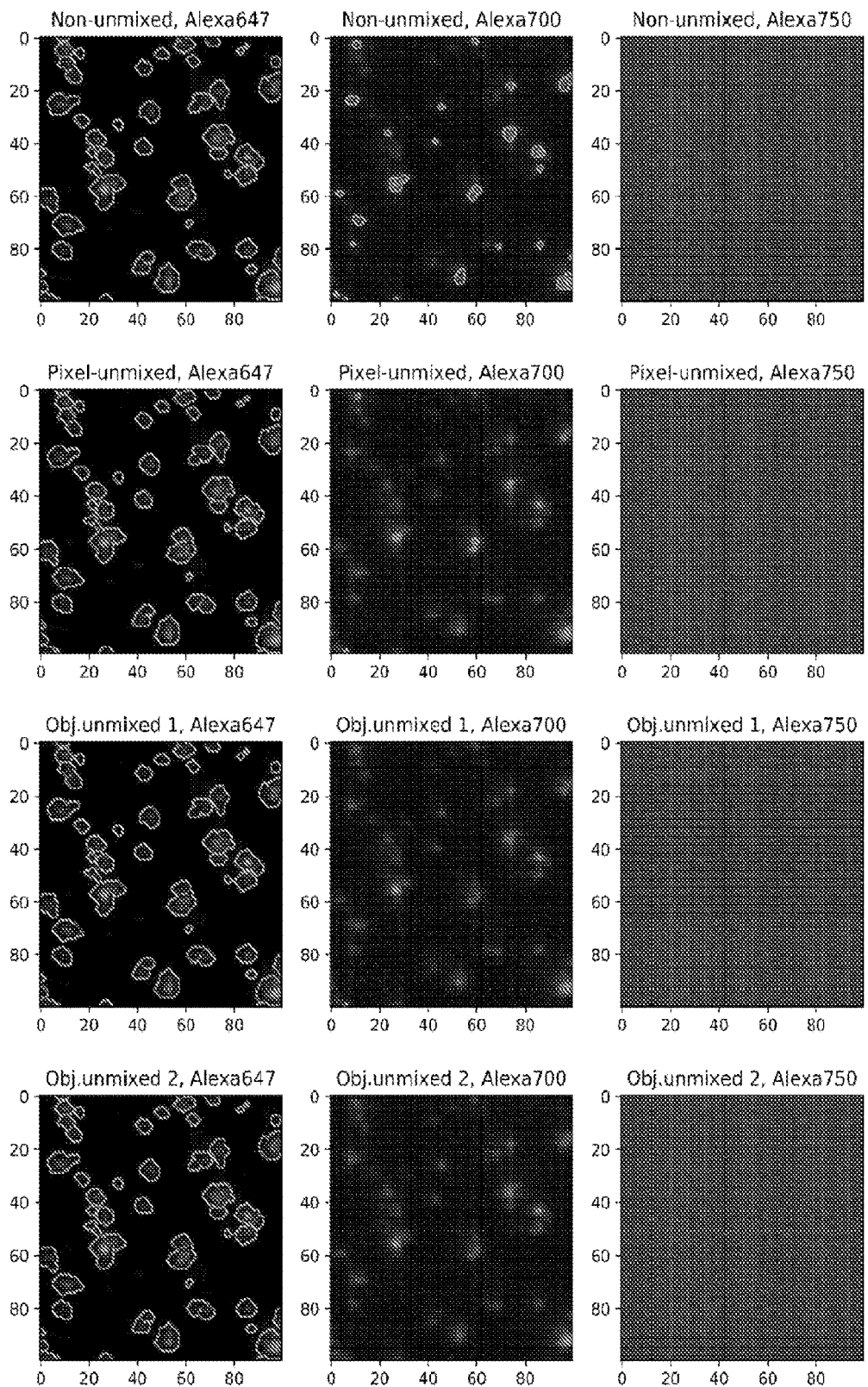
Figure 12:
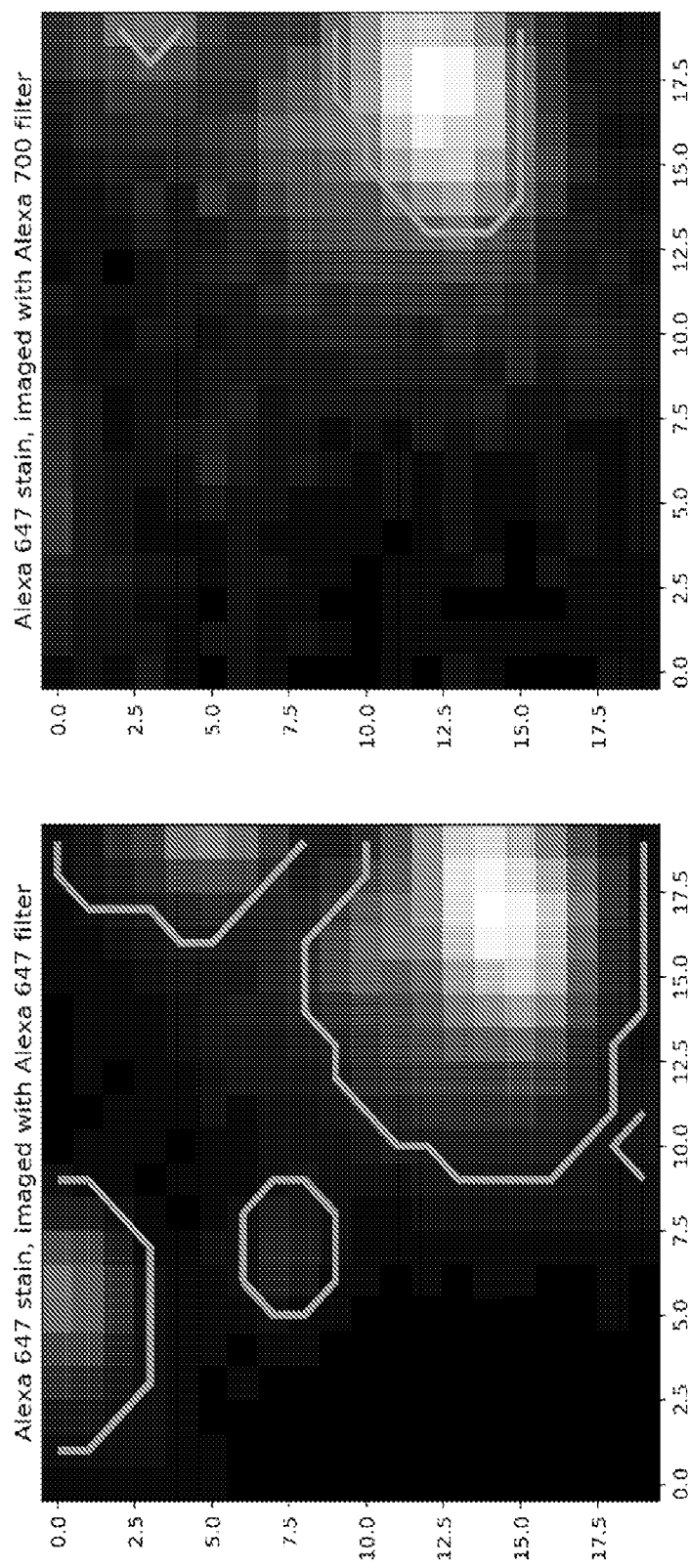
FIG. 12 shows a close up view of images from the experiments of FIG. 10. The images demonstrate the spectral crosstalk between two spectrally adjacent channels. The well shown in these images contained Alexa 647 fluorophores only. Left: imaging with Alexa 647 filter. Right: imaging with Alexa 700 filter. Red contours show the results of image segmentation.

The results of these analyses are shown on FIGS. 11, 12, 13 and 14. FIG. 11 shows the results of experimental validation of the spectral unmixing processes described herein using a singular staining approach, as described in Example 1 with Alexa 647 as the single dye used. The images shown were captured for the same locus, using different dye filters (from left to right: Alexa 488, Alexa 546, Alexa 596, Alexa 647, Alexa 700, Alexa 750). Rows correspond to different scenarios (top to bottom: non-unmixed, pixel-unmixed, object-unmixed 1 (hard object unmixing), object-unmixed 2 (soft object unmixing)). Objects appear as grayscale blobs. Red contours show the results of image segmentation. As Alexa 647 was the only dye used, most of the segmented objects appear in the Alexa 647 channel. All of these are expected to be true objects. Some objects are also detected in the Alexa 700 channel prior to unmixing (see top row), all of which are expected to be crossing objects. Comparing the second row to the third and fourth rows shows that pixel unmixing did not successfully remove all of the crossing objects in the Alexa 700 channel. By contrast, both object unmixing approaches successfully removed all crossing objects in the Alexa 700 channel, without losing any of the true objects in the Alexa 647 channel. FIG. 12 shows a close up view of images from the experiments of FIG. 11. The images demonstrate the spectral crosstalk between two spectrally adjacent channels. The same experimental validation was performed using each of the other dyes mentioned (i.e. Alexa 488, Alexa 546, Alexa 596, Alexa 700, Alexa 750) as single dye.

Figure 13:
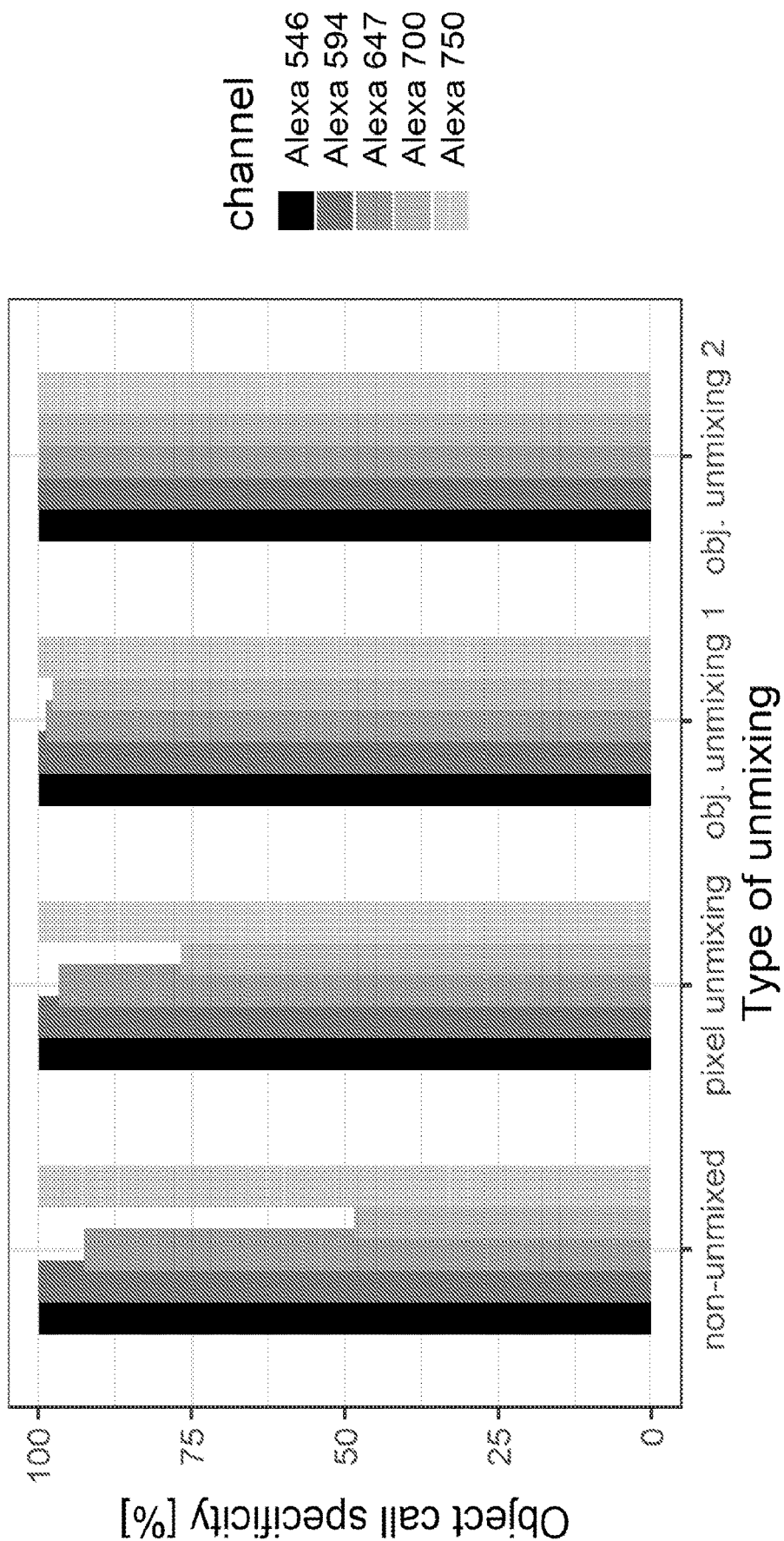
FIG. 13 shows the results of experimental validation of the spectral unmixing processes described herein, in terms of specificity. The graph shows the specificity of different unmixing processes: for channel i, unmixing specificity was defined as $$100 \cdot \left(1 - \frac{N_j}{N_i}\right),$$

FIGS. 13 and 14 show the results of experimental validation of the spectral unmixing processes described herein (single dyes approach, i.e. a single dye was used in each well, and each well was imaged in all channels), in terms of specificity (FIG. 13) and relative change in the number of objects called compared to a non-unmixed case (FIG. 14). The graph on FIG. 13 shows the specificity of different unmixing processes: for channel i, unmixing specificity was defined $$100 \cdot \left(1 - \frac{N_j}{N_i}\right),$$

as where $N_i$ is the number of objects detected when imaging wells that contained fluorophores corresponding to the imaged channel, and $N_j$ is the number of objects detected when imaging wells that contained fluorophores not corresponding to the imaged channel. As the unmixing approaches used work on emission spectra, channel Alexa 488 was not subject to crosstalk and the specificity for this channel was therefore perfect (100%). The data on FIG. 13 shows that both object unmixing approaches are associated with better unmixing specificities compared to both pixel unmixing and no unmixing. For channel i, relative change in the number of called objects (FIG. 14) was defined as $$100 \cdot \frac{N_{alg} - N_0}{N_0},$$

where $N_0$ is the number of objects per image reported for the non-unmixed case in the "true" channel, and $N_{alg}$ is the number of objects per image reported by the specific unmixing process. As the data was obtained using a "single dye" approach, the number of objects determined without unmixing in the channel corresponding to the dye that was used ($N_0$) should represent the true number of objects. Comparing this number to the number $N_{alg}$ (number of objects called in the "true channel" when unmixing is applied) allows to assess the number of objects that are erroneously removed or added by the unmixing process. In the particular case where only one dye is in fact present in the image (as is the case in the data on FIGS. 13-14), a perfect process would call a number of object $N_0$ in each channel and the values on FIG. 14 would be 0. The data on FIG. 14 shows that both object unmixing approaches resulted in very few erroneously called objects (less than 0.5%) for each of the dyes tested. The proportions of erroneously called objects shown on FIG. 14 for the object unmixing approaches are comparable to those obtained with the pixel unmixing approach, while also having improved specificity (see FIG. 13). Thus, FIGS. 13-14 show that any potential "negative impact" of object unmixing is similar to that obtainable with pixel unmixing (FIG. 14), while the "positive impact" in terms of improved specificity (see FIG. 13) is higher with either of the object unmixing approaches than with the pixel unmixing approach. .

REFERENCES

1. Valm, A. M. et al. (2016), "Multiplexed Spectral Imaging of 120 Different Fluorescent Labels", PLOS ONE 11(7): e0158495. doi:10.1371/journal.pone.0158495.
2. McRae, T. D. et al. (2019), "Robust blind spectral unmixing for fluorescence microscopy using unsupervised learning", PLOS ONE 14(12): e0225410, doi.org/10.1371/journal.pone.0225410.
3. Preim & Botha (2014), "Image Analysis for Medical Visualization", in Visual Computing for Medicine, Second Edition, 2014, doi.org/10.1016/C2011-0-05785-X.
4. WO 2017/020023, "Nucleic Acids And Methods For Detecting Chromosomal Abnormalities".
5. WO 2017/020024, "System and Methods For Genetic Analysis".
6. Stryer et al. (1978), "Fluorescence Energy Transfer as a Spectroscopic Ruler", Ann. Rev. Biochem., 47:819. doi.org/10.1146/annurev.bi.47.070178.004131.
7. Selvin, P R (1995), "Fluorescence resonance energy transfer", Methods Enzymol., 246:300. DOI: 10.1016/0076-6879(95)46015-2.
8. M. Ali, et al. (2014), "Rolling circle amplification: a versatile tool for chemical biology, materials science and medicine". Chemical Society Reviews. 43 (10): 3324-3341. DOI: 10.1039/c3cs60439j
9. WO 2015/083002, "Multiplex Detection Of Nucleic Acids".
10. Meyer et. al. (2014), "Advances in DVA-directed immobilization" Current Opinions in Chemical Biology, 18:8: 8-15. DOI: 10.1016/j.cbpa.2013.10.023
11. WO 2019/195346 "Methods, Systems, and Compositions for Counting Nucleic Acids".

All literature and similar materials cited in this application, including the publications described in the Bibliography above, and including but not limited to patents, patent applications, articles, books, treatises, and internet web pages, are expressly incorporated by reference in their entireties for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

The methods of any embodiments described herein may be provided as computer programs or as computer program products or computer readable media carrying a computer program which is arranged, when run on a computer, to perform the method(s) described above.

Unless context dictates otherwise, the descriptions and definitions of the features set out above are not limited to any particular aspect or embodiment of the invention and apply equally to all aspects and embodiments which are described.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. The meaning of "in" includes "in" and "on."

"And/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

Other aspects and embodiments of the invention provide the aspects and embodiments described above with the term "comprising" replaced by the term "consisting of" or "consisting essentially of", unless the context dictates otherwise.

The transitional phrase "consisting essentially of" as used in claims in the present application limits the scope of a claim to the specified materials or steps "and those that do not materially affect the basic and novel characteristic(s)" of the claimed invention, as discussed in In re Herz, 537 F.2d 549, 551-52, 190 USPQ 461, 463 (CCPA 1976). For example, a composition "consisting essentially of" recited elements may contain an unrecited contaminant at a level such that, though present, the contaminant does not alter the function of the recited composition as compared to a pure composition, i.e., a composition "consisting of" the recited components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in molecular biology, molecular diagnostics, nucleic acids structure, biochemistry, medical science, or related fields are intended to be within the scope of the claims.

We claim:

1. A method of processing images, the method comprising the steps of:
    receiving image data comprising a plurality of single channel images of an area of a sample;
    performing image segmentation of each single channel image individually, to identify sets of pixels that form objects;
    performing pixel unmixing at least for pixels that form part of at least two of said identified objects, to determine an estimated abundance of a signal in the respective channels, in each of said unmixed pixels;
    for each of said identified objects:
        identifying a candidate channel as one of the plurality of channels, based on the estimated abundances for the pixels in the respective object; and
        removing the object from the results of the image segmentation step if one or more conditions(s) are satisfied, the one or more condition(s) comprising: the candidate channel being different from the channel in which the object was identified, thereby obtaining updated image segmentation results.

2. The method of claim 1, wherein the one or more conditions further comprise:
    a source of a signal associated with the candidate channel being a source that is known to produce a signal in the channel in which the object was identified.

3. The method of claim 1, wherein pixel unmixing is only performed for pixels that form part of at least two of said identified objects.

4. The method of claim 1, wherein identifying a candidate channel as one of the plurality of channels comprises assigning a single channel to each pixel in the object, wherein for each unmixed pixel the single channel is assigned based on the estimated abundances for the pixel, and assigning the single channel that is associated with a highest number of pixels in the object as the candidate channel for the object.

5. The method of claim 4, wherein assigning a single channel to each unmixed pixel in the object comprises assigning the single channel that is associated with a highest estimated abundance for the respective unmixed pixel.

6. The method of claim 1, wherein identifying a candidate channel for an object comprises determining a set of summarized estimated abundances for the object, based on the estimated abundances for the pixels in the object.

7. The method of claim 6, wherein identifying a candidate channel as one of the plurality of channels comprises assigning the single channel that is associated with the highest summarized estimated abundance as the candidate channel for the object.

8. The method of claim 6, wherein a set of summarized estimated abundances for an object is obtained as a measure of centrality of the estimated abundances for the pixels in the object, wherein the measure of centrality being the channel-wise average of the estimated abundances of the pixels in the object.

9. The method of claim 1, wherein the one or more conditions further comprise: the relative likelihood of the object belonging to the candidate channel and the channel in which the object was identified being above a predetermine threshold, wherein the relative likelihood is an odds ratio.

10. The method of claim 9, wherein the likelihood of the object belonging to a subject channel is determined using a summarized estimated abundance for the object, in the subject channel $\widehat{p_n^{c'}}$, determined based on the estimated abundances for the subject channel associated with the pixels in the object.

11. The method of claim 10, wherein the likelihood of the object belonging to a subject channel is determined as $$\frac{(1 - \widehat{p_n^c})}{\widehat{p_n^c}}$$

where $\widehat{p_n^{c'}}$ is the summarized estimated abundance for the object, in the subject channel.

12. The method of claim 1, wherein performing image segmentation comprises identifying foreground pixels in each of the single channel images, wherein objects only include foreground pixels.

13. The method of claim 12, further comprising setting background pixels to a predetermined value, wherein the predetermined value is lower than an intensity of all foreground pixels.

14. The method of claim 12, wherein identifying foreground pixels in a subject single channel image comprises:
using one or more corresponding negative control image(s), defining a threshold on a difference between pixel intensities and corresponding neighborhood pixel intensities; and
applying the threshold to the pixels in a subject image, wherein a pixel is identified as foreground if the difference between the intensity of said pixel and corresponding neighborhood pixel intensities is at or above the threshold.

15. The method of claim 14, wherein defining a threshold on the difference between pixel intensities and corresponding neighborhood pixel intensities comprises obtaining a distribution of differences between pixel intensities and corresponding neighborhood pixel intensities in the one or more negative control images, and identifying the threshold as a percentile value in said distribution.

16. The method of claim 1, wherein the results of the image segmentation step further comprises a segmentation map where pixels in objects are labelled differently from pixels not in objects, and removing an object from the results of the image segmentation step further comprises re-labelling the pixels that form the object, in the segmentation map, to match the labels of pixels not in objects.

17. The method of claim 1, further comprising: outputting to a user, using a user interface, the updated image segmentation results for at least one of the single channel images, wherein the outputting comprises displaying the updated image segmentation results overlaid on one or more corresponding single channel image(s).

18. The method of claim 1, wherein the single channel images are microscope images, wherein the single channel images are fluorescence microscope images, or wherein the sample is a sample that includes a plurality of fluorescent labels, each fluorescent label being associated with one of the plurality of channels.

19. The method of claim 1, further comprising using the updated image segmentation results to identify a presence and/or abundance of signals associated with the objects in the single channels.

20. The method of claim 1, wherein the sample is a nucleic acid sample, a DNA sample, a genomic DNA sample or a cell-free DNA sample.

21. A method for analyzing a sample, the method comprising:
receiving image data comprising a plurality of single channel images of an area of the sample;
performing image segmentation of each single channel image individually, to identify sets of pixels that form objects;
performing pixel unmixing at least for pixels that form part of at least two of said identified objects, to determine an estimated abundance of a signal in the respective channels, in each of said unmixed pixels;
for each of said identified objects:
identifying a candidate channel as one of the plurality of channels, based on the estimated abundances for the pixels in the respective object; and
removing the object from the results of the image segmentation step if one or more conditions(s) are satisfied, the one or more condition(s) comprising: the candidate channel being different from the channel in which the object was identified, thereby obtaining updated image segmentation results.

22. The method of claim 21, wherein the one or more conditions further comprise: a source of a signal associated with the candidate channel being a source that is known to produce a signal in the channel in which the object was identified.

23. The method of claim 21, further comprising:
acquiring image data comprising a plurality of single channel images of an area of the sample; and/or
labelling the sample using one or more fluorescent labels, luminescent labels, or colorimetric labels, each label being associated with one of the plurality of channels.

24. A system for processing microscope images, the system comprising:
at least one processor; and
at least one non-transitory computer readable medium containing instructions that, when executed by the at least one processor, cause the at least one processor to perform the method of claim 1.

25. One or more non-transitory computer readable medium or media comprising instructions that, when executed by at least one processor, cause the at least one processor to perform the method of claim 1.

* * * * *